US007435949B2

(12) United States Patent
Ohtake et al.

(10) Patent No.: US 7,435,949 B2
(45) Date of Patent: Oct. 14, 2008

(54) MASS SPECTROMETRIC ANALYSIS METHOD AND SYSTEM USING THE METHOD

(75) Inventors: Atsushi Ohtake, Hitachiota (JP); Kinya Kobayashi, Hitachi (JP); Toshiyuki Yokosuka, Hitachinaka (JP); Kiyomi Yoshinari, Hitachi (JP)

(73) Assignee: Hitachi High-Technologies Corporation, Tokyo (JP)

( * ) Notice: Subject to any disclaimer, the term of this patent is extended or adjusted under 35 U.S.C. 154(b) by 316 days.

(21) Appl. No.: 11/439,949

(22) Filed: May 25, 2006

(65) Prior Publication Data

US 2006/0289735 A1 Dec. 28, 2006

(30) Foreign Application Priority Data

May 27, 2005 (JP) ............................ 2005-156157

(51) Int. Cl.
*B01D 59/44* (2006.01)
*H01J 49/26* (2006.01)

(52) U.S. Cl. ....................... 250/281; 250/282; 250/286; 250/288; 250/398

(58) Field of Classification Search ................. 250/281, 250/282, 286, 288, 398
See application file for complete search history.

(56) References Cited

U.S. PATENT DOCUMENTS 3,480,774 A * 11/1969 Smith ......................... 250/309
5,087,815 A * 2/1992 Schultz et al. .............. 250/309
7,180,056 B2 * 2/2007 Ohtake et al. ............... 250/282
2001/0007349 A1 7/2001 Nagai

FOREIGN PATENT DOCUMENTS

JP 10-142196 5/1998
JP 2001-249114 9/2001

* cited by examiner

*Primary Examiner*—Nikita Wells
(74) *Attorney, Agent, or Firm*—Antonelli, Terry, Stout & Kraus, LLP.

(57) ABSTRACT

A tandem analysis system is provided for ionizing a substance, performing mass spectrometric analysis of various ion types generated, selecting and dissociating an ion type, the ion type having a specific mass-to-charge ratio, and thereby, repeating mass spectrometric analysis measurement on the ion of the ion type over n-th stages. A processing judges control content for the analysis next to $MS^n$ (the n-th stage mass spectrometric analysis) within a predetermined time, based on ion intensity being represented by an ion peak with respect to the mass-to-charge ratio of each ion in the $MS^n$ result. An ion detection unit judges isotope-peak from the measured ionized data. Assuming that the $MS^1$ count number of a parent-ion peptide measured during a certain constant time-interval is I, a data processing unit makes the $MS^2$ integration number-of-times or analysis time of the peptide proportional to 1/I.

17 Claims, 21 Drawing Sheets

FIG. 4

INTERNAL DATABASE (DB)

CHARACTERISTIC DATA ON PEPTIDE WHOSE $MS^N$ (N≧2) MEASUREMENT HAD BEEN TERMINATED ONE TIME
MASS NUMBER m, VALENCE NUMBER z, MASS-TO-CHARGE RATIO m/z, INTENSITY I, PEAK-DETECTION START TIME τ1, $MS^N$ ANALYSIS TIME τ2, INTEGRATION VALUE Q = (INTENSITY I) × (INTEGRATION NUMBER-OF-TIMES N) × (CONFIGURATION-UNIT READ NUMBER D OR PEAK NUMBER K), CONFIGURATION-UNIT READ NUMBER D, PEAK NUMBER K, ANALYSIS CONDITION,

| PEPTIDE NAME/SEQUENCE | m [Da] | z [-] | m/z | I | τ1[min] | τ2[min] | INTEGRATION VALUE Q | CONFIGURATION-UNIT READ NUMBER D | PEAK NUMBER K | ANALYSIS CONDITION (TANDEM ANALYSIS ORDER) |
|---|---|---|---|---|---|---|---|---|---|---|
| PEPTIDE A | 200 | 1 | 200 | 260 | 20 | 22 | 23400 | 6 | 20 | 2 |
| PEPTIDE B | 700 | 2 | 350 | 200 | 28 | 32 | 19100 | 5 | 12 | 2 |
| PEPTIDE C | 450 | 1 | 450 | 100 | 35 | 40 | 12400 | 2 | 3 | 3 |
| ⋮ | ⋮ | ⋮ | ⋮ | ⋮ | ⋮ | ⋮ | ⋮ | ⋮ | ⋮ | ⋮ |

CHARACTERISTIC DATA ON ONE-TIME IDENTIFIED PROTEIN, OR PROTEIN-ORIGINATED PEPTIDE WISHED TO BE EXCLUDED OUT OF TANDEM ANALYSIS TARGETS
PROTEIN NAME, MASS NUMBER m, VALENCE NUMBER z, MASS-TO-CHARGE RATIO m/z, INTENSITY I, PEAK-DETECTION START TIME τ1, MSN ANALYSIS TIME τ2, INTEGRATION VALUE Q, CONFIGURATION-UNIT READ NUMBER D, PEAK NUMBER K, ANALYSIS CONDITION,

| PEPTIDE NAME/SEQUENCE | PROTEIN NAME | m [Da] | z [-] | m/z | I | τ1[min] | τ2[min] | INTEGRATION VALUE Q | CONFIGURATION-UNIT READ NUMBER D | PEAK NUMBER K | ANALYSIS CONDITION (TANDEM ANALYSIS ORDER) |
|---|---|---|---|---|---|---|---|---|---|---|---|
| PEPTIDE A | PROTEIN A | 200 | 1 | 420 | 260 | 22 | 27 | 25690 | 2 | 6 | 3 |
| PEPTIDE B | PROTEIN A | 700 | 2 | 264 | 200 | 28 | 30 | 14823 | 4 | 11 | 3 |
| PEPTIDE E | PROTEIN B | 450 | 1 | 589 | 100 | 62 | 65 | 35692 | 6 | 12 | 2 |
| ⋮ | ⋮ | ⋮ | ⋮ | ⋮ | ⋮ | ⋮ | ⋮ | ⋮ | ⋮ | ⋮ | ⋮ |

CHARACTERISTIC DATA ON CARBOHYDRATE CHAIN WHOSE (MSN (N†2)) MEASUREMENT HAD BEEN TERMINATED ONE TIME
PROTEIN NAME, MASS NUMBER M, VALENCE NUMBER Z, MASS-TO-CHARGE RATIO M/Z, INTENSITY I, PEAK-DETECTION START TIME τ1, MSN ANALYSIS TIME τ2, INTEGRATION VALUE Q, CONFIGURATION-UNIT READ NUMBER D, PEAK NUMBER K, ANALYSIS CONDITION,

| CARBOHYDRATE CHAIN NAME /STRUCTURE | m [Da] | z [-] | m/z | I | τ1[min] | τ2[min] | INTEGRATION VALUE Q | CONFIGURATION-UNIT READ NUMBER D | PEAK NUMBER K | ANALYSIS CONDITION (TANDEM ANALYSIS ORDER) |
|---|---|---|---|---|---|---|---|---|---|---|
| CARBOHYDRATE CHAIN A | 1002 | 2 | 501 | 310 | 26 | 27 | 23400 | 8 | 25 | 2 |
| CARBOHYDRATE CHAIN B | 840 | 2 | 420 | 298 | 48 | 50 | 19100 | 5 | 18 | 2 |
| CARBOHYDRATE CHAIN C | 1280 | 2 | 640 | 250 | 31 | 32 | 12400 | 4 | 10 | 3 |
| ⋮ | ⋮ | ⋮ | ⋮ | ⋮ | ⋮ | ⋮ | ⋮ | ⋮ | ⋮ | ⋮ |

CHARACTERISTIC DATA ON CHEMICAL SUBSTANCE WHOSE (MSN (N†2)) MEASUREMENT HAD BEEN TERMINATED ONE TIME
PROTEIN NAME, MASS NUMBER m, VALENCE NUMBER z, MASS-TO-CHARGE RATIO m/z, INTENSITY I, PEAK-DETECTION START TIME τ1, MSN ANALYSIS TIME τ2, INTEGRATION VALUE Q, CONFIGURATION-UNIT READ NUMBER D, PEAK NUMBER K, ANALYSIS CONDITION,

| CHEMICAL SUBSTANCE NAME/STRUCTURE | m [Da] | z [-] | m/z | I | τ1[min] | τ2[min] | INTEGRATION VALUE Q | CONFIGURATION-UNIT READ NUMBER D | PEAK NUMBER K | ANALYSIS CONDITION (TANDEM ANALYSIS ORDER) |
|---|---|---|---|---|---|---|---|---|---|---|
| CHEMICAL SUBSTANCE A | 210 | 1 | 200 | 260 | 20 | 22 | 23400 | 5 | 11 | 2 |
| CHEMICAL SUBSTANCE B | 700 | 1 | 350 | 200 | 28 | 32 | 19100 | 2 | 3 | 3 |
| CHEMICAL SUBSTANCE C | 450 | 1 | 450 | 100 | 35 | 40 | 12400 | 5 | 18 | 2 |
| ⋮ | ⋮ | ⋮ | ⋮ | ⋮ | ⋮ | ⋮ | ⋮ | ⋮ | ⋮ | ⋮ |

CHARACTERISTIC DATA ON NOISE-OR-IMPURITY-ORIGINATED ION TYPE
PROTEIN NAME, MASS NUMBER m, VALENCE NUMBER z, MASS-TO-CHARGE RATIO m/z, INTENSITY I, PEAK-DETECTION START TIME τ1, MSN ANALYSIS TIME τ2, INTEGRATION VALUE Q, CONFIGURATION-UNIT READ NUMBER D, PEAK NUMBER K, ANALYSIS CONDITION,

| m [Da] | z [-] | m/z | I | τ1[min] | τ2[min] | INTEGRATION VALUE Q | CONFIGURATION-UNIT READ NUMBER D | PEAK NUMBER K | ANALYSIS CONDITION (TANDEM ANALYSIS ORDER) |
|---|---|---|---|---|---|---|---|---|---|
| 361 | 1 | 361 | - | 55 | 59 | - | - | - | - |
| 640 | 1 | 640 | - | 34 | 38 | - | - | - | - |
| 290 | 1 | 290 | - | 42 | 48 | - | - | - | - |
| ⋮ | ⋮ | ⋮ | ⋮ | ⋮ | ⋮ | ⋮ | ⋮ | ⋮ | ⋮ |

MASS SPECTROMETRIC ANALYSIS METHOD AND SYSTEM USING THE METHOD

BACKGROUND OF THE INVENTION

1. Field of the Invention

The present invention relates to a mass spectrometric analysis system and method using a mass spectroscope.

2. Description of the Related Art

In general mass spectrometric analysis, after a sample of measurement target is ionized, various types of ions generated are transferred into a mass spectroscope. Then, the ion intensity is measured for each mass-to-charge ratio (m/z), i.e., ratio of mass number m to valence number z of each ion. The mass spectrum acquired as a result of this measurement includes peaks (i.e., ion peaks) of the ion intensity measured with respect to each mass-to-charge ratio. Performing the mass spectrometric analysis of the ionized sample in this way is referred to as "$MS^1$".

In the tandem mass spectroscope capable of performing multi-stage dissociation, the ion peak having the value of a certain specific mass-to-charge ratio m/z is selected (the selected ion type is referred to as "parent ion") from among the ion peaks detected by $MS^1$. Moreover, the parent ion is dissociated and decomposed by an operation such as collision with gas molecules. Then, the mass spectrometric analysis is performed for dissociated ion types generated, thereby acquiring the mass spectrum similarly. Here, dissociating the parent ion over n stages then to perform the mass spectrometric analysis of dissociated ion types generated is referred to as "$MS^{n+1}$". In this way, in the tandem mass spectroscope, the parent ion is dissociated over the multi stages (i.e., first stage, second stage, . . . , n-th stage), then performing the analysis of mass numbers of the dissociated ion types generated at each stage (i.e., $MS^2$, $MS^3$, . . . , $MS^{n+1}$).

In the mass spectroscope capable of performing the tandem mass spectrometric analysis, in most cases, the parent ion at the time of performing $MS^2$ analysis is selected from among the ion peaks acquired in $MS^1$. At this time, the mass spectroscope is equipped with the following data dependent function: Namely, the ion peak is selected as the parent ion in the order of the ion peaks of the descending ion intensities, e.g., the ion peak whose ion intensity falls within the top-ten intensities is selected. Then, the dissociation and mass spectrometric analysis (i.e., $MS^2$) is performed for the parent ion.

In the ion-trap mass spectroscope manufactured by Finnigan Corporation, the parent ion at the time of performing $MS^2$ analysis is selected from among the ion peaks acquired in $MS^1$. At this time, the ion-trap mass spectroscope is equipped with the following dynamic exclusion function: Namely, the ion type having a mass-to-charge ratio m/z value specified in advance by user is selected and avoided as the parent ion.

US 2001/0007349A1 (JP-A-2001-249114) and JP-A-10-142196 can be cited as publicly-known examples concerning judgments on coincidence degree between an ion type measured and a pre-measured ion type.

In US 2001/0007349A1 (JP-A-2001-249114), a characteristic ion peak within first-stage spectrum data and second-stage spectrum data on the ion type corresponding thereto are stored into a database. In the measurement thereinafter, the second-stage spectrum data stored in the database is compared with spectrum data acquired by second-stage mass spectrometric analysis of the measurement-target sample, thereby checking the coincidence degree. Then, data component having the highest coincidence degree is outputted as the comparison result.

In JP-A-10-142196, in the multi-stage dissociation measurement, the continuous measurement is performed with no intervention of a sample injection process during the measurement, thereby avoiding an ion-intensity variation caused by the data injection between $MS^n$ and $MS^{n+1}$. This avoidance makes the addition of a standard sample unnecessary, thereby allowing implementation of the efficient quantitative analysis. In $MS^n$ and $MS^{n+1}$ data analysis, $MS^{n+1}$ measurement is carried out, or the measurement returns to $MS^1$ measurement by checking whether or not the data coincide with specified ion data already collected.

SUMMARY OF THE INVENTION

In the data dependent function of the above-described conventional technologies, the tandem analysis will be performed with the highest priority for a protein emerging in large quantities, or peptides originating from the protein. As a result, there exists a high possibility that already identified protein or peptides will be measured in an overlapping manner. This possibility leads to wastes in the measurement time and sample. So far, the tandem analysis has been performed with the protein emerging in large quantities as the center of the analysis. It is conceivable from now on, however, that the center of the tandem analysis is going to transfer to the analysis of a minute quantity of protein such as a disease-affected protein. The data dependent function, however, finds it difficult to perform the tandem analysis of the minute quantity of protein in detail.

In the dynamic exclusion function of the above-described conventional technologies, it is judged by the mass-to-charge ratio m/z value whether or not the ion type is the one having a mass-to-charge ratio m/z value specified in advance by user. On account of this, there exists a possibility that an ion type, whose mass number m and valence number z differ therefrom even if whose mass-to-charge ratio m/z value is equal thereto, will be excluded from the target of $MS^2$ analysis. Trying to avoid this possibility requires that, when judging whether or not the ion type is the one specified in advance, the judgment be made not from the mass-to-charge ratio m/z value but from the valence number z and mass number m of each ion peak. At this time, it becomes required to calculate the valence number z and mass number m of each ion peak in real time during the measurement. Moreover, measurement of ions which have continued being measured for a certain constant time-interval is avoided whether the ions are low-intensity ions or high-intensity ions. On account of this, in the case of the low-intensity ions, information for data retrieval lacks; whereas, in the case of the high-intensity ions, measurement throughput is reduced.

In US 2001/0007349A1 (JP-A-2001-249114) and JP-A-10-142196, in $MS^n$ data analysis, identification of a specific ion type is carried out by the comparison with the database or the like. In US 2001/0007349A1 (JP-A-2001-249114) and JP-A-10-142196 as well, the registered value on the database is the mass-to-charge ratio m/z value. Namely, the mass number m itself has been not necessarily used. Otherwise, the univalent ions (i.e., Z=1) have been preconditioned. Also, none of information (e.g., individual characteristic data on the valence number z and mass number m) other than the measurement value on the mass-to-charge ratio m/z is used in MS analysis. Namely, the information suitable for efficient ion selection has been not necessarily used.

In order to solve the problems of the above-described conventional technologies, an object of the present invention is to provide a mass spectrometric analysis system for taking advantage of information included in the $MS^n$ spectrum at each stage of $MS^n$, and allowing a change in measurement integration number-of-times at the time of carrying out $MS^{n+1}$ analysis to be carried out within a real time of the measurement with a high efficiency and a high accuracy.

In the present invention, in a mass spectrometric analysis system using a tandem mass spectroscope for ionizing a measurement-target substance, performing mass spectrometric analysis of various ion types generated, selecting and dissociating an ion type from among the various ion types generated, the ion type having a specific mass-to-charge ratio (m/z), and thereby, repeating mass spectrometric analysis measurement on the ion of the ion type over n stages (n=1, 2, . . . ), there is provided a data processing unit for judging control content for the analysis next to $MS^n$ within a predetermined time, on each analysis-target ion basis, and based on ion intensity, the $MS^n$ being the n-th stage mass spectrometric analysis, the ion intensity being represented by an ion peak with respect to the mass-to-charge ratio of each ion in the $MS^n$ result.

Namely, the mass spectrum ($MS^n$) is analyzed at a high speed within a real time of the measurement, thereby determining the integration number-of-times of the measurement, the mass spectrum ($MS^n$) being acquired by performing the dissociation and the mass spectrometric analysis of the target ion (n−1) times.

Preferably, it is judged at a high speed whether or not each ion peak in the mass spectrum ($MS^n$) is an isotope peak. If it has been judged that each ion peak is the isotope peak, valence number z and mass number m of each ion peak are calculated from a spacing (=1/z) between the isotope peaks. Moreover, based on this mass number m, it is judged whether or not each ion peak coincides with an ion type specified in advance.

Preferably, when a liquid chromatography (LC) (or gas chromatography) is set up at the preceding stage to the mass spectroscope, retention time of the LC is also used as a judgment material. This is performed in order to distinguish between ion types whose mass numbers m are the same but whose structures are different.

Preferably, in order to prevent the measurement from overlapping, the following data are stored into an internal database built in the mass spectrometric analysis system: A peptide about which integration value of the measurement-ion count numbers has become larger than a constant value specified by user, mass number of a peptide originating from a protein already identified, the retention time, and the count number and the count-number integration value. Then, it is judged at a high speed whether or not the data coincide with each ion peak in the mass spectrum ($MS^n$).

Preferably, when letting the $MS^1$-ion count number of a peptide of the parent ion for $MS^2$ analysis be I, the integration number-of-times or measurement time of $MS^2$ analysis of the peptide is made proportional to 1/I. Here, if the integration number-of-times or measurement time is larger than a certain constant value Max, the integration number-of-times or measurement time is set at the Max. Meanwhile, if the integration number-of-times or measurement time is smaller than another constant value Min, the integration number-of-times or measurement time is set at the Min. When selecting target of the next analysis, an isotope peak is avoided.

According to the present invention, when performing the multi-stage dissociation and the mass spectrometric analysis ($MS^n$), the information included in the $MS^n$ spectrum are made effective use of at each stage of $MS^n$, thereby implementing optimization of the analysis flows such as the selection of a parent ion at the time of carrying out the next $MS^{n+1}$ analysis. This feature makes it possible to perform the high-efficiency and high-accuracy judgment within a measurement real time. This, further, results in no wastes in the measurement, and allows implementation of the tandem mass spectrometric analysis of a target which user wishes.

Other objects, features and advantages of the invention will become apparent from the following description of the embodiments of the invention taken in conjunction with the accompanying drawings.

BRIEF DESCRIPTION OF THE DRAWINGS

FIG. 4 is a configuration diagram of storage content stored in an internal database;

DESCRIPTION OF THE INVENTION

Figure 1:
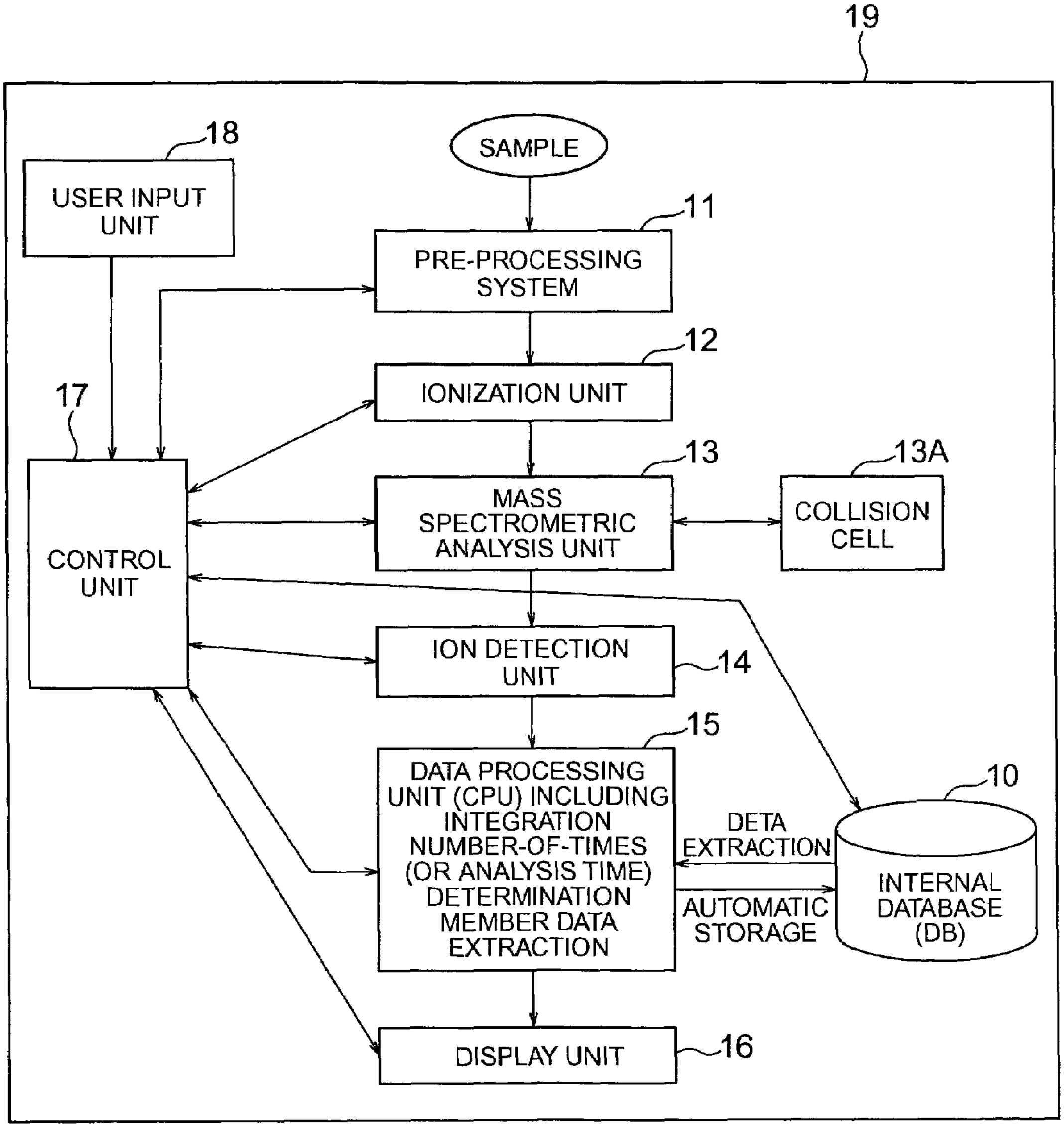
FIG. 1 is an entire configuration diagram of the mass spectrometric analysis system according to a first embodiment of the present invention.

Hereinafter, referring to the drawings, the explanation will be given below concerning embodiments of the present invention. First, the explanation will be given below regarding a first embodiment.

FIG. 1 is a function block diagram for illustrating configuration of the mass spectrometric analysis system according to the first embodiment of the present invention. In a mass spectroscope 19, an analysis-target sample is pre-processed in a pre-processing system 11 such as a liquid chromatography. For example, if the original sample is a protein, the original sample is decomposed in the pre-processing system 11 into the size of a polypeptide by a digestion enzyme, then being separated and segmented by a gas chromatography (GC) or the liquid chromatography (LC). Hereinafter, an example will be given where the LC is employed as the separation/segmentation system in the pre-processing system 11.

After the separation/segmentation of the sample has been finished, the sample is ionized in an ionization unit 12, then being separated depending on the mass-to-charge ratio m/z of each ion in a mass spectrometric analysis unit 13. Here, m denotes ion mass of each ion, and z denotes charged valence number of each ion. Moreover, the separated ions are detected in an ion detection unit 14, then being subjected to a data arrangement/processing in a data processing unit 15. Incidentally, the data processing unit 15 is a feature portion of the present invention. The data processing unit 15 includes a determination member for determining integration number-of-times or analysis time of the next analysis. Its analysis result, i.e., mass spectrometric analysis data 1, is displayed on a display unit 16.

At this time, in the data processing unit 15 including the determination member for determining the integration number-of-times or analysis time of the next analysis, it is judged whether or not data stored in an internal database 10, i.e., a database which the mass spectroscope 19 has inside, and the data on the ions detected in the mass spectrometric analysis unit 13 coincide with each other.

The analysis content thus determined is transferred to a control unit 17. The control unit 17 controls operation conditions or the like so that the next analysis will be able to be carried out. The whole of these series of mass spectrometric analysis processes (i.e., ionization of the sample, transportation and incidence of the sample ion beam into the mass spectrometric analysis unit 13, mass separation process, and, ion detection, data processing, comparison with the data inside the internal database, determination of the next analysis content) is controlled in the control unit 17.

Here, the internal database 10 stores therein measurement data acquired at the time of analyzing one and the same sample in the past, in particular, measurement data on a parent ion whose $MS^n$ ($n \geqq 2$) analysis has been carried out. The measurement data are ones such as m/z of each ion detected, m, LC retention time, structure capable of being estimated (i.e., sequence of amino acids), and the operation conditions (i.e., integration number-of-times or the like).

Mass spectrometric analysis methods are classified into the method (i.e., MS analysis method) where the sample is ionized and analyzed with no further processing added thereto, and the tandem mass spectrometric analysis method. In the tandem mass spectrometric analysis method, a specific sample ion (i.e., parent ion) is selected based on the mass-to-charge ratio, and then the mass spectrometric analysis is performed for dissociated ions which are generated by dissociating the parent ion.

The tandem mass spectrometric analysis method also includes the ($MS^n$) function of performing the dissociation/mass-spectrometric-analysis over multi stages. More concretely, an ion (i.e., precursor ion) having a specific mass-to-charge ratio is selected from among the dissociated ions. Moreover, this precursor ion is further dissociated, and then the mass spectrometric analysis is performed for dissociated ions which are generated as the result of the dissociation of the precursor ion. Namely, mass spectrometric analysis distribution of a substance within a sample, which is the starting point, is measured as the mass-spectrum data ($MS^1$). After that, a parent ion having a certain m/e value is selected, and then the parent ion is dissociated. Moreover, mass spectrometric analysis data on dissociated ions acquired are measured ($MS^2$). After that, a precursor ion selected from among the dissociated ions detected in $MS^2$ data is further dissociated. Furthermore, mass spectrometric analysis data on dissociated ions acquired are measured ($MS^3$).

In this way, the dissociation/mass-spectrometric-analysis is performed over the multi stages ($MS^n$ ($n \geqq 3$)). This multistage method makes it possible to acquire molecular structure information on the precursor ions (i.e., states before the dissociations) on each dissociation-stage basis. Accordingly, this method is effective in estimating the structures of the precursor ions. The more detailed the structure information on these precursor ions becomes, the more the estimation accuracy is enhanced which is found at the time of estimating the parent-ion structure (i.e., the starting-point structure).

In the present embodiment, as the dissociation method for dissociating the precursor ions (parent ion), at first, the explanation will be given below concerning the case of employing the collision induced dissociation method where the ions are dissociated by the collision with a buffer gas such as helium.

Dissociating the precursor ions (parent ion) by the collision requires a neutral gas such as helium gas. On account of this, as illustrated in FIG. 1, a collision cell 13A for implementing the collision dissociation is provided separately from the mass spectrometric analysis unit 13. It is also preferable, however, to fill the mass spectrometric analysis unit 13 with the neutral gas, and thereby to cause the collision dissociation to occur inside the mass spectrometric analysis unit 13. In that case, the collision cell 13A becomes unnecessary. Also, as the dissociation method, it is also preferable to employ the electron capture dissociation method where the parent ion is irradiated with low-energy electrons thereby to cause the parent ion to capture the low-energy electrons in large quantities.

In the case of $MS^{n+1}$ analysis ($n \geqq 1$) where, in accordance with the above-described method, the precursor ion is dissociated then to perform the mass spectrometric analysis of its dissociated ions, the mass-spectrum intensity acquired becomes lower than intensity of the precursor ion. In view of this situation, the following processing is performed: Namely, $MS^{n+1}$ analysis is repeated within a determined time and over determined number-of-times (i.e., the integration number-of-times). Then, the data acquired in this way are integrated. In particular, when the analysis-target sample is of a minute quantity, the processing like this becomes required.

Figure 3:
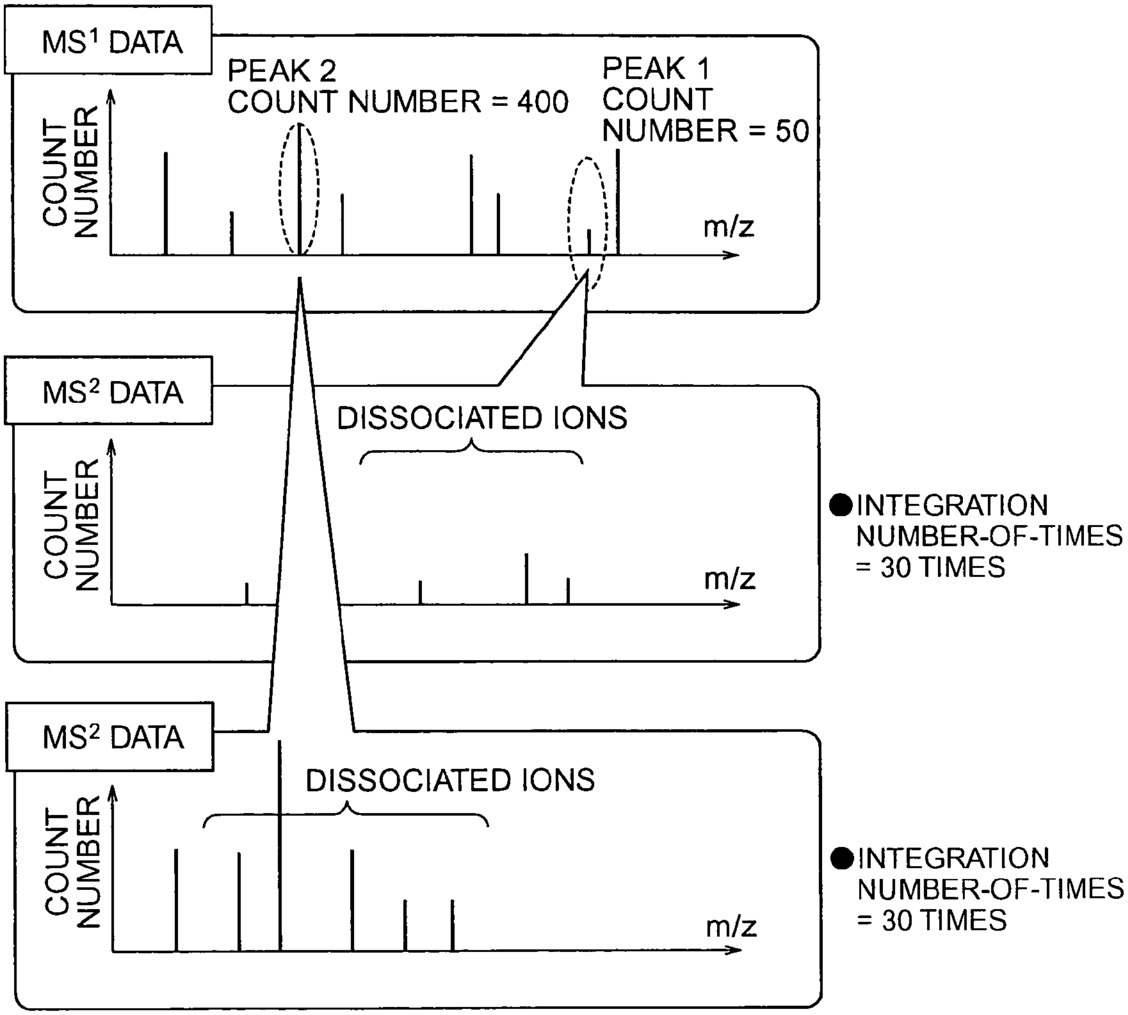
FIG. 3 is an explanatory diagram of a conventional example of the integration processing in $MS^2$ analysis.

FIG. 3 illustrates a conventional example of mass spectra acquired by the integration processing in $MS^2$ analysis. When there exist a plurality of target-ion (i.e., parent-ion) types for $MS^2$ analysis, and when carrying out $MS^2$ analysis for each of the parent-ion types, $MS^{n+1}$ analysis is repeated for each of the parent-ion types within a determined time and over determined number-of-times (i.e., integration number-of-times) regardless of intensities of the parent ions. For example, with respect to either of the parent ion for a peak 1 and the parent ion for a peak 2, the integration number-of-times of $MS^{n+1}$ analysis is set at 30 times which has been set in advance by user. Accordingly, summation value Nsum of the integration number-of-times becomes equal to 60 times (i.e., 2×30 times).

In general, if the intensity of a parent ion is lower, the spectrum intensity acquired in $MS^{n+1}$ analysis also becomes lower. Namely, consider a case where, regardless of the intensities of parent ions, the integration is performed over the same integration number-of-times for any of the parent ions. In this case, if the integration number-of-times is made compliant with a higher-intensity parent ion, $MS^{n+1}$ analysis result of a lower-intensity parent ion lacks the intensity of $MS^{n+1}$ spectrum. As a result, the information amount acquired becomes smaller as compared with the case of the higher-intensity parent ion. The time required for one-time integration is fixed (a few to a few tens of milliseconds). Accordingly, the analysis time T (=the integration number-of-times N×the analysis time for one-time analysis (a few tens of milliseconds, specified by user)) varies depending on the integration number-of-times. On account of this, if the integration number-of-times is made compliant with the lower-intensity parent ion, it turns out that the integration will be repeated more than required with respect to the higher-intensity parent ion. This results in a reduction in the throughput of the analysis.

In the present embodiment, the integration number-of-times of each of ($MS^{n+1}$ (n≧1)) analyses is automatically set in real time such that the integration number-of-times is made inversely proportional to the intensity of a parent ion.

Figure 2:
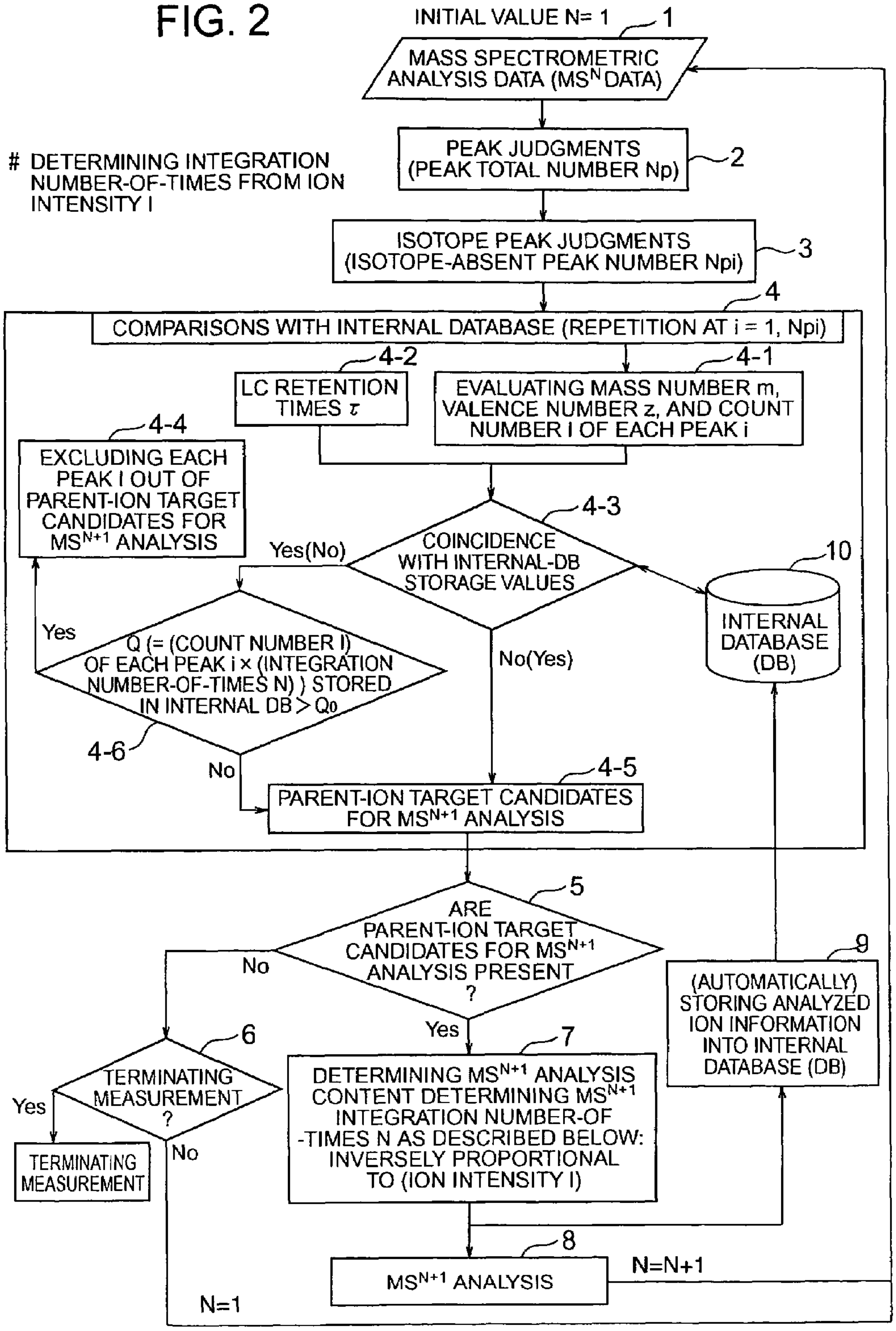
FIG. 2 is a flowchart diagram of automatic judgment processing in the mass spectrometric analysis flow according to the first embodiment of the present invention.

FIG. 2 is a flowchart diagram for making an automatic judgment processing for the control content for the next analysis in the mass spectrometric analysis system which is the first embodiment of the present invention. First, $MS^n$ (n≧1) data, i.e., the mass spectrometric analysis data measured in the mass spectrometric analysis system 19, are taken in (step 1). Then, peaks are judged (step 2), and it is judged whether or not the peaks on which the peak judgments have been made are isotope peaks (step 3).

Figure 6:
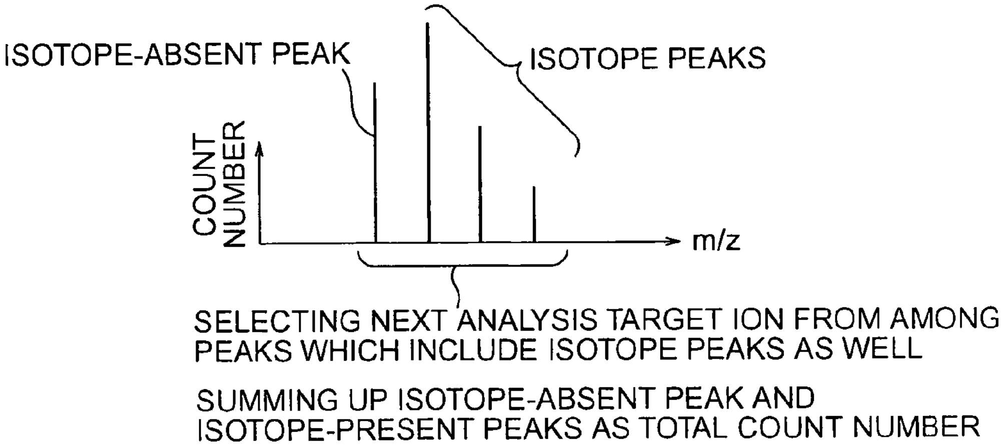
FIG. 6 is an explanatory diagram for explaining an example of dealing with the ion intensity.

Next, as illustrated in FIG. 6, with respect to the peaks (the peak number $N_{pi}$) which have been judged not to be the isotope peaks, comparisons with the internal database 10 are made (step 4). The internal database 10 stores therein the measurement data acquired at the time of analyzing one and the same sample in the past, in particular, the measurement data on the parent ion whose ($MS^{n+1}$ (n≧1)) analysis has been carried out (i.e., m/z of each ion detected, LC retention time, structure capable of being estimated (sequence of amino acids), operation conditions (integration number-of-times), and the like). Also, here, the judgment is made regarding the analysis control content such as the integration number-of-times.

As $MS^{n+1}$ (n≧2) analysis which is the next analysis to $MS^n$ (n≧2) analysis, a parent ion is selected from among the ions detected in $MS^n$ (n≧2) data, and then the parent ion is dissociated to perform the mass spectrometric analysis of its dissociated ions. In addition thereto, if an ion on $MS^{n-1}$(n≧2) data, whose mass number is equal to the parent ion in $MS^n$ (n≧2) but whose valence number differs therefrom, has been detected on $MS^{n-1}$ (n≧2) data, it is also allowable to carry out $MS^n$ (n≧2) analysis once again by selecting this ion as the parent ion. In this case as well, the integration number-of-times is made inversely proportional to the intensity of the ion in $MS^{n-1}$ (n≧2) data whose mass number is equal to the parent ion in $MS^n$ (n≧2) but whose valence number differs therefrom.

FIG. 4 illustrates configuration of the storage content stored in the internal database 10. The internal database stores therein the characteristic data on each ion (peptide) whose $MS^n$ (n≧2) measurement had been terminated one time (i.e., m/z value, mass number m, valence number z, LC retention times: τ1 (ion-detection start time), τ2 (ion $MS^n$-analysis time), integration value Q, configuration-unit read number D, peak number K, and analysis condition). Refer to the steps 4-1 and 4-2.

The integration value Q in the present embodiment is defined by Q=(parent-ion count number I in $MS^{n+1}$ analysis)×(the integration number-of-times N). The integration value Q, however, may also be defined by Q=(the count number I)×(the integration number-of-times N)×(the configuration-unit read number D). Otherwise, Q may also be defined by Q=(the count number I)×(the integration number-of-times N)×(the peak number K). These will be explained later.

In addition to the characteristic data on each ion measured, data to be stored into the internal database are as follows: Characteristic data on a protein identified one time, characteristic data on a peptide originating from a protein wished to be excluded out of tandem analysis targets, characteristic data on a carbohydrate chain whose ($MS^{n+1}$ (n≧1)) measurement had been terminated one time, characteristic data on a chemical substance whose ($MS^{n+1}$ (n≧1)) measurement had been terminated one time, or characteristic data on an ion type originating from noise or impurity.

It is retrieved within a preparation time (e.g., within whatever time of 100 m sec, 10 m sec, 5 m sec, and 1 m sec) up to the next measurement whether or not these pieces of storage data stored in the internal database 10 and $MS^1$ data whose measurement has been terminated just now coincide with each other with a certain tolerance degree (step 4-3). If the respective peaks in $MS^1$ data do not coincide with the storage data in the internal database 10 with a certain tolerance degree (i.e., No), ions for the respective peaks are listed up as parent-ion candidates for $MS^{n+1}$ analysis in the order of the descending ion intensities (step 4-5).

Meanwhile, if the respective peaks in $MS^1$ data coincide with the storage data in the internal database 10 with a certain tolerance degree (i.e., Yes), it is judged whether or not, regarding the ions stored in the internal database 10, the integration value Q stored in the internal database 10 is larger than $Q_0$ specified by user (step 4-6). Only if the integration value Q is smaller than $Q_0$ (i.e., No), the ions are listed up as the parent-ion candidates for $MS^{n+1}$ analysis. Meanwhile, if the integration value Q is larger than $Q_0$ (i.e., Yes), it is judged that no further analysis is required. Accordingly, the ions are excluded out of the parent-ion candidates for $MS^{n+1}$ analysis (step 4-4).

In this way, it is judged whether the parent-ion target candidates for $MS^{n+1}$ analysis are present or absent (step 5). If the parent-ion target candidates for $MS^{n+1}$ analysis are absent (step 6), the measurement transfers to the next sample analysis (i.e., $MS^1$), or the measurement is terminated. Meanwhile, if the parent-ion target candidates for $MS^{n+1}$ analysis are present, $MS^{n+1}$ analysis content is determined (step 7). At the step 7, the integration number-of-times is determined in response to the intensity of the parent ion (i.e., ion count number). Furthermore, based on its result, $MS^{n+1}$ analysis is carried out (step 8). Also, information on the ions analyzed are sequentially stored into the internal database 10 (step 9).

As described above, determining the control content for the next analysis is carried out within the preparation time (e.g., within whatever time of 100 m sec, 10 m sec, 5 m sec, and 1 m sec). Here, the explanation will be given below concerning details of the determination of the integration number-of-times in response to the intensity of a parent ion.

Figure 5:
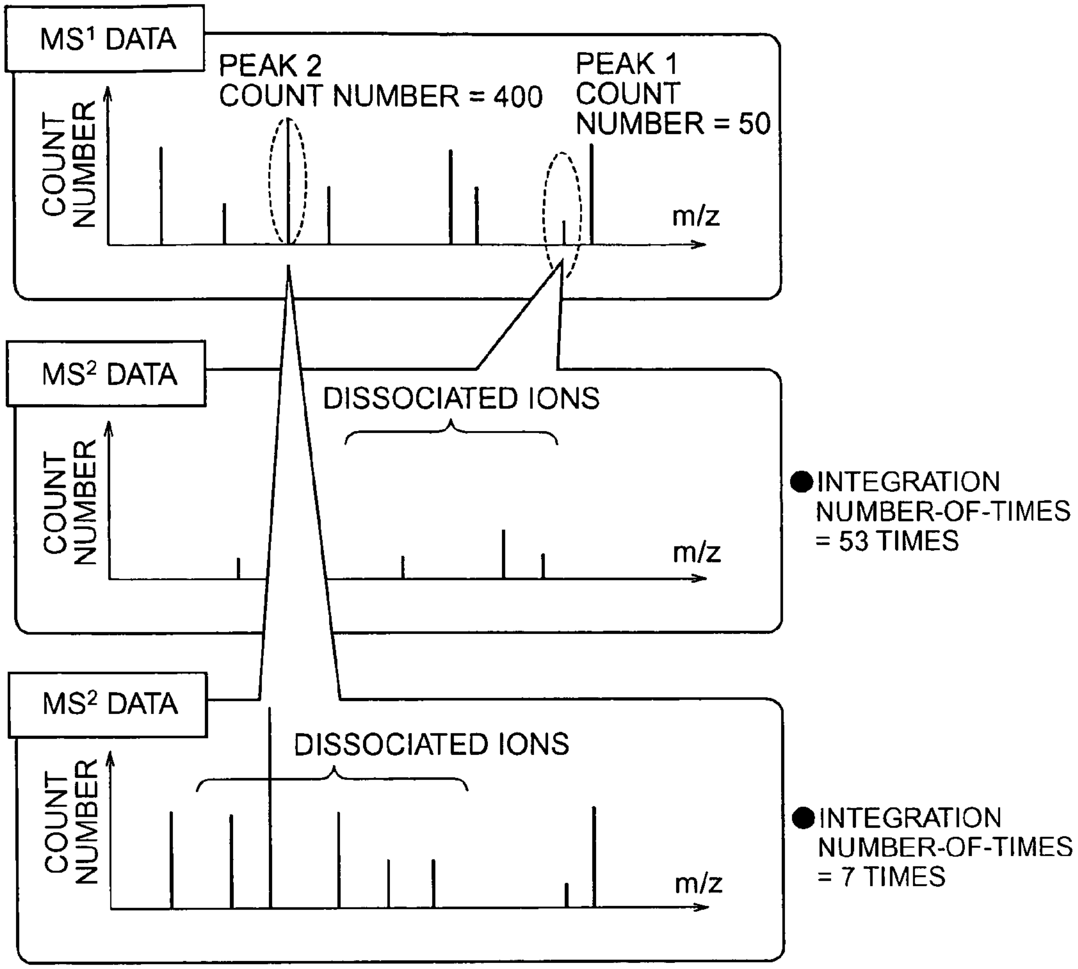
FIG. 5 is an explanatory diagram of the integration processing in $MS^2$ analysis according to the first embodiment.

FIG. 5 illustrates an example of the difference between mass spectra acquired by the integration processing in $MS^2$ analysis. From $MS^1$ data in FIG. 5, ion count number of the parent ion for a peak 1 and that of the parent ion for a peak 2 are equal to 50 and 400, respectively. Then, summation value Nsum of the integration number-of-times (=60 times) is distributed such that, based on the following expression (1), the distributed integration number-of-times are made proportional to the inverses 1/50 and 1/400 of the respective ion count numbers: Incidentally, here, the summation value Nsum of the integration number-of-times is the value set by user.

$$1/50:1/400=(N\text{sum}-x):x \quad (1)$$

Solving the expression (1) gives the solution of x=7.3333 . . . . In this case, the integration number-of-times for the peak 1 and the one for the peak 2 need to be converted into integers. Accordingly, the integration number-of-times are rounded off to the first decimal place. This results in the solutions of (Nsum−x)≈53 times and x≈7 times.

Having received this result, as illustrated in FIG. 5, in $MS^2$ analysis which is to be carried out next, the $MS^2$-analysis integration number-of-times for the peak 1 becomes equal to 53 times, and the $MS^2$-analysis integration number-of-times for the peak 2 becomes equal to 7 times.

In the above-described explanation, the $MS^2$-analysis integration number-of-times are determined such that the $MS^2$-analysis integration number-of-times are made inversely proportional to the intensities of the parent ions. However, in substitution for the integration number-of-times, the $MS^2$ analysis times or $MS^2$ ion accumulation times may also be determined such that they are made inversely proportional to the intensities of the parent ions.

Also, when making the judgment on the integration number-of-times or analysis time in $MS^2$ analysis, as the intensity (i.e., count number) of a parent ion, a value may also be considered which results from adding the ion intensity including an isotope to the ion intensity including no isotope. For example, FIG. 6 is the explanatory diagram for dealing with the ion intensity. When selecting the next analysis target ion from among peaks which include isotope peaks as well, total count number of the target ions is determined by summing up an isotope-absent peak and isotope-present peaks.

Also, taking advantage of the user input unit 18 allows user to input maximum value or minimum value of the integration number-of-times or analysis time (or ion accumulation time) in $MS^2$ analysis. If the integration number-of-times or analysis time in $MS^2$ analysis calculated by the above-described determination method has exceeded its maximum value or minimum value, the integration number-of-times or analysis time (or ion accumulation time) in $MS^2$ analysis is determined at its maximum value or minimum value. This causes the integration number-of-times or analysis time (or ion accumulation time) to fall within the range specified by user.

The use of the user input unit 18 also allows user to input the following information: Type of the digestion enzyme, necessity for the isotope peak judgments, necessity for the comparison/retrieval with the internal database, the tolerance degree for judging the data coincidence in the comparison/retrieval with the internal database, resolution at the time of selecting a parent ion, and the like.

Consequently, according to the present embodiment, with respect to a higher-intensity parent ion, the extra $MS^2$-analysis integration number-of-times is reduced. Also, with respect to a lower-intensity parent ion, the $MS^2$-analysis integration number-of-times is increased. This feature allows implementation of the high-throughput and high-sensitivity tandem mass spectrometric analysis.

Next, referring to FIG. 7, FIG. 8, and FIG. 9, the explanation will be given below concerning a second embodiment of the present invention. Here, the integration number-of-times or analysis time (or ion accumulation time) in the next $MS^{n+1}$ (n≧1) analysis is determined in response to not only the intensity of a parent ion, but also an estimated structure of the parent ion.

In a method for making the judgment on control content for the analysis next to $MS^n$, when n denotes the second-stage mass spectrometric analysis, i.e., in the case of $MS^2$, the structure of the parent ion (e.g., sequence of amino acids in the case of a protein, or carbohydrate-chain structure in the case of a carbohydrate chain) is immediately estimated from the dissociation data on $MS^2$. As a result, the integration number-of-times or analysis time (or ion accumulation time) in $MS^{n+1}$ (n≧1) analysis is determined so that the integration number-of-times or analysis time (or ion accumulation time) becomes inversely proportional to the product of the number of the structure units read out (e.g., number of the amino acids read out) and the intensity of the parent ion.

Also, assume the following case: Namely, in the first-stage mass spectrometric analysis, the tandem mass spectrometric analysis had been carried out before with respect to the same measurement target, and $MS^2$ measurement had been carried out with respect to the same parent ion on $MS^1$. Moreover, as a result, the structure of the parent ion (e.g., sequence of amino acids) had been estimated. In this case, of course, the structure of the parent ion has been stored in the internal database. Based on this structure information, the integration number-of-times or analysis time (or ion accumulation time) in $MS^{n+1}$ (n≧1) analysis is determined so that the integration number-of-times or analysis time (or ion accumulation time) becomes inversely proportional to the product of the number D of the structure units read out (e.g., number of the amino acids read out) and the intensity I of the parent ion.

Figure 7:
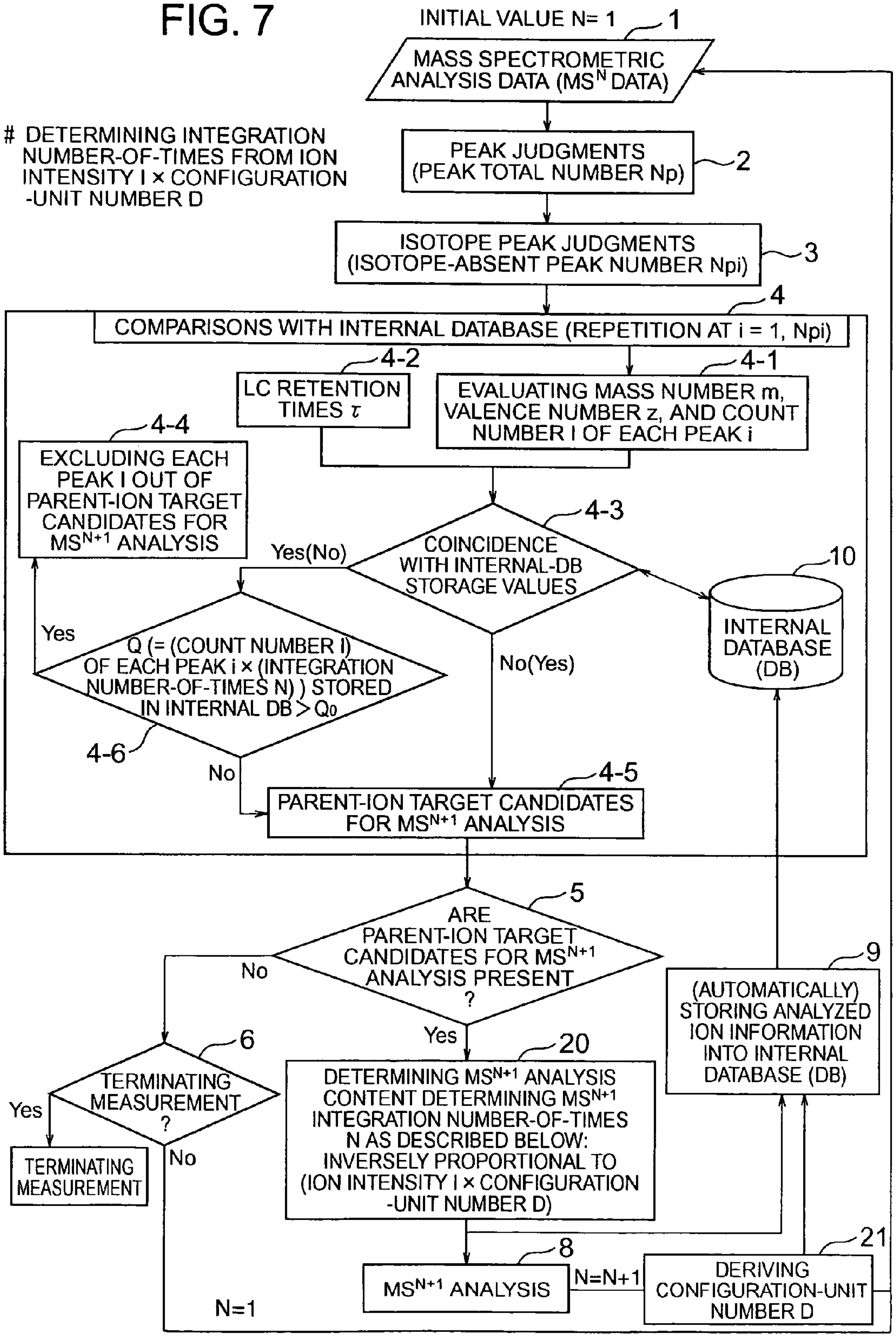
FIG. 7 is a flowchart diagram of the automatic judgment processing in the mass spectrometric analysis flow according to a second embodiment of the present invention.

FIG. 7 illustrates a processing flowchart diagram in the second embodiment. Unlike the first embodiment, in the determination of $MS^{n+1}$-analysis control content in the second embodiment, the integration number-of-times or analysis time (or ion accumulation time) in $MS^{n+1}$ (n≧1) analysis is determined so that the integration number-of-times or analysis time (or ion accumulation time) becomes inversely proportional to the ion intensity I×the configuration-unit number D (step 20). Furthermore, after $MS^{n+1}$ analysis (step 8), the configuration-unit number D at n=n+1 is derived (step 21). Then, the processing returns to the step 1.

Figure 8:
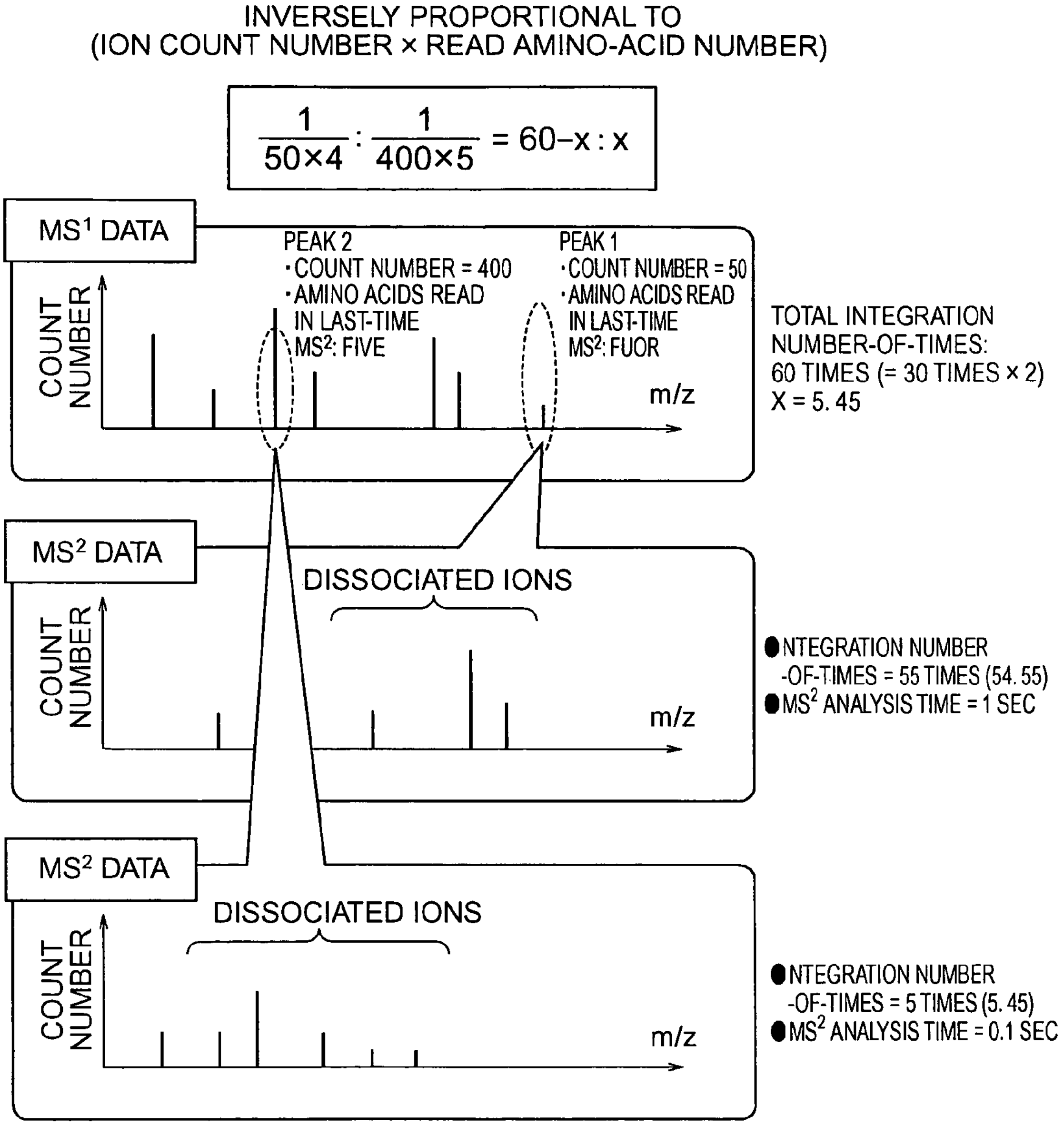
FIG. 8 is an explanatory diagram of the integration processing in $MS^2$ analysis according to the second embodiment.

FIG. 8 illustrates an example of the judgment on the integration number-of-times using the configuration-unit number D. The intensities of ions whose $MS^2$ analyses are to be performed are equal to the count numbers in FIG. 5. In addition thereto, here, information on amino acids read when analyzed before are also utilized. If the number of the amino acids read in the last-time $MS^2$ is four at the peak 1, and if the one read therein is five at the peak 2, the distributed integration number-of-times are determined so that, as indicated in the following expression (2), the distributed integration number-of-times become inversely proportional to the ion intensities×the read amino-acid numbers:

$$1/(50\times4):1/(400\times5)=(60-x):x \quad (2)$$

This distribution makes it possible to distribute the larger integration number-of-times to the peak 1. In this way, by utilizing, in the judgment, not only the ion intensities but also the result analyzed before, it becomes possible to implement the high-efficiency and high-accuracy analysis. Although, here, the distribution example of the integration number-of-times has been indicated, the analysis times can also be allocated from the products of the intensities of the target ions and the configuration-unit numbers D.

According to the present embodiment, the structure of a parent ion (e.g., number of amino acids decoded) is taken into consideration. Accordingly, if, actually, the structure of the parent ion has been successfully read out to some extent, the integration number-of-times can be set at a smaller value even if the intensity of the parent ion is lower. This setting makes it possible to eliminate wastes in the measurement.

Depending on a measurement target, however, there are some cases where it is difficult to decode the unit structure of the parent-ion structure (e.g., sequence of amino acids). In this case, in substitution for the number D of the unit structure of the parent-ion structure (e.g., sequence of amino acids), the dissociation peak number K may also be used. The reason for this is as follows: Namely, in general, the more the dissociation peaks become in number, the more the structure information is included in amount. This allows an enhancement in the estimation accuracy of the parent-ion structure.

Figure 9:
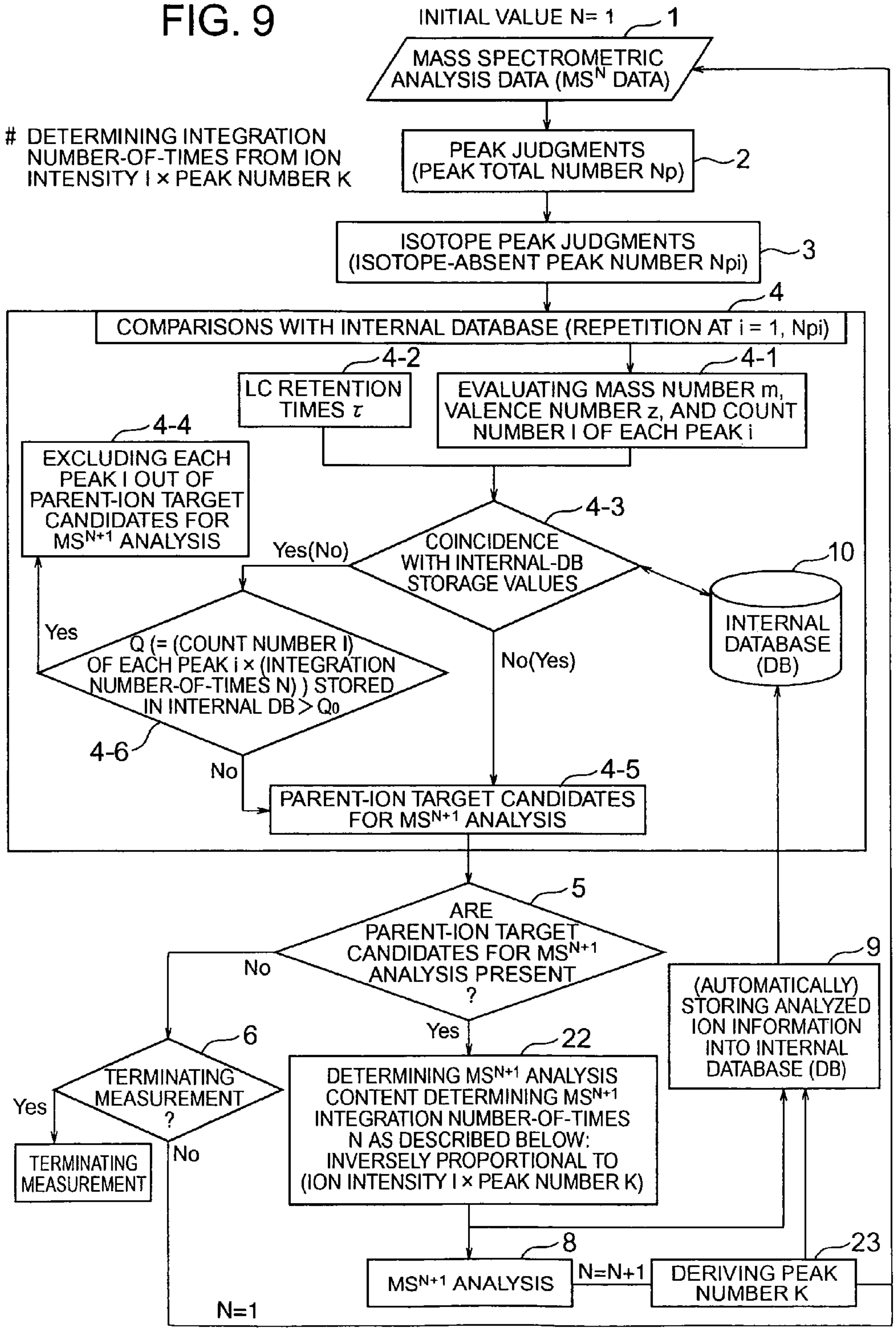
FIG. 9 is a flowchart diagram of the automatic judgment processing in the mass spectrometric analysis flow according to a modified embodiment of the second embodiment of the present invention.

FIG. 9 illustrates a processing flowchart diagram of a modified embodiment of the second embodiment, where the dissociation peak number K is used. The present modified embodiment differs therefrom in a point that, instead of the step 20 in FIG. 7, the peak number K is used (steps 22 and 23).

By the way, concerning the read number D of the configuration units and the peak number K of a parent-ion structure, which are the criteria (i.e., judgment reference values) to be used for the analysis control judgment, cases are conceivable where these values become equal to zero, or where these values become extremely large due to influences by noise. Taking these cases into consideration, taking advantage of the user input unit 18 allows user to input maximum value Dmax or minimum value Dmin of the configuration-unit read number D, or maximum value Kmax or minimum value Kmin of the peak number K. If a value which exceeds these values has been determined, the respective maximum values or minimum values are set at the D values or K values.

Consequently, according to the present embodiment, the integration number-of-times in $MS^{n+1}$ analysis can be determined in response to the structure information already acquired. This feature allows implementation of the high-accuracy, high-throughput, and high-sensitivity tandem mass spectrometric analysis.

Figure 10:
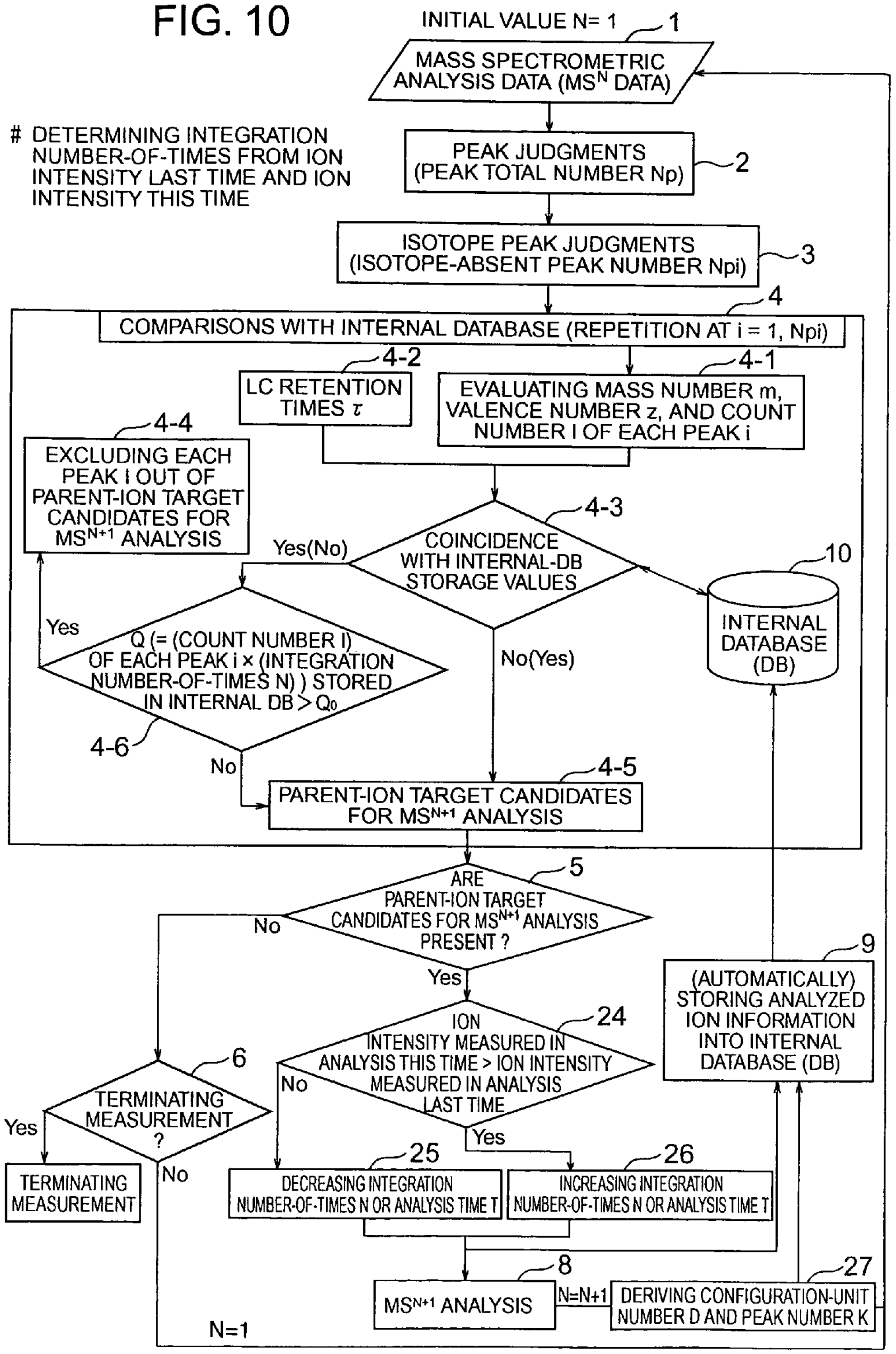
FIG. 10 is a flowchart diagram of the automatic judgment processing in the mass spectrometric analysis flow according to a third embodiment of the present invention.

Next, the explanation will be given below concerning a third embodiment of the present invention. FIG. 10 illustrates a processing flowchart diagram in the present embodiment. Here, when the integration number-of-times or analysis time (or ion accumulation time) in the analysis next to $MS^n$ is determined in response to the intensity of a parent ion, the same LC-MS analysis is employed as the target.

In the LC-MS analysis, in some cases, there exists the following case: Namely, the tandem mass spectrometric analysis had been carried out before with respect to the same measurement target. Furthermore, from its $MS^n$ data, it is found that the ion intensity or ion count number of a parent-ion type measured this time has exceeded the ion intensity or ion count number of the same parent-ion type measured before. In this case, the integration number-of-times or analysis time (or ion accumulation time) in the analysis next to $MS^n$ is increased than in the last-time analysis. Similarly, if the ion intensity or ion count number of the parent-ion type measured this time has lowered than that of the same parent-ion type measured before, the integration number-of-times or analysis time (or ion accumulation time) in the analysis next to $MS^n$ is decreased than in the last-time analysis (Refer to the steps 24-27).

Figure 11:
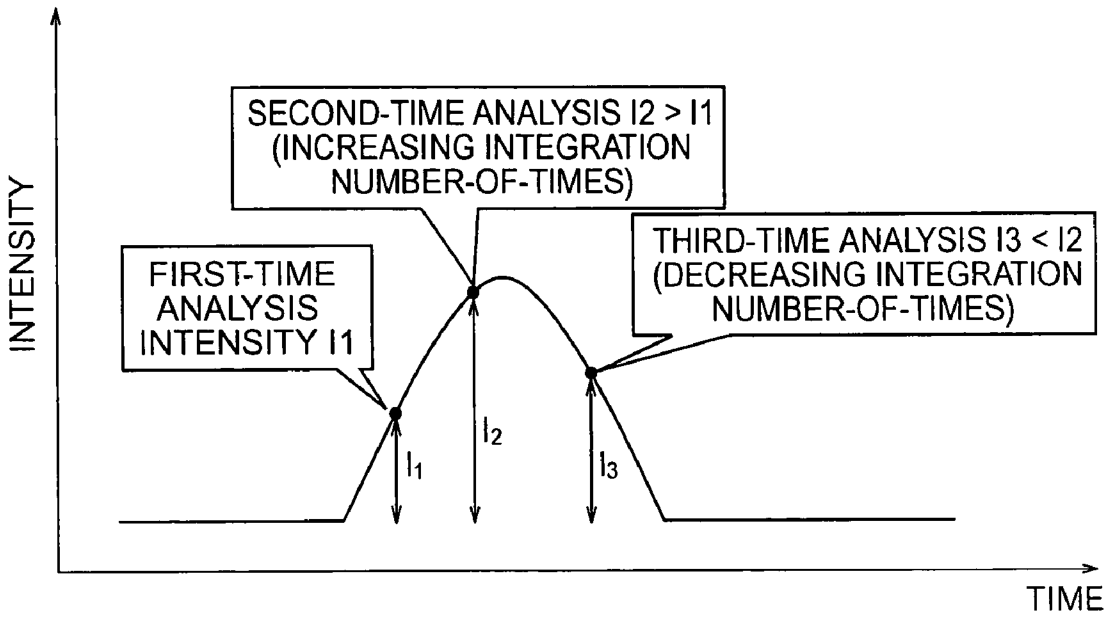
FIG. 11 is an explanatory diagram for explaining analysis number-of-times and analysis intensity according to the third embodiment.

FIG. 11 illustrates the analysis number-of-times and the analysis intensity. In the detections of ions separated by the LC, time widths exist therebetween. Accordingly, the integration number-of-times or analysis time (or ion accumulation time) is set from the intensity in the analysis next to $MS^n$. Here, this intensity can be expected this time based on the parent-ion intensity measured last time. Consequently, according to the present embodiment, it becomes possible to eliminate wastes in the measurement. This feature allows an expectation for the high-efficiency implementation of the analysis.

Figure 12:
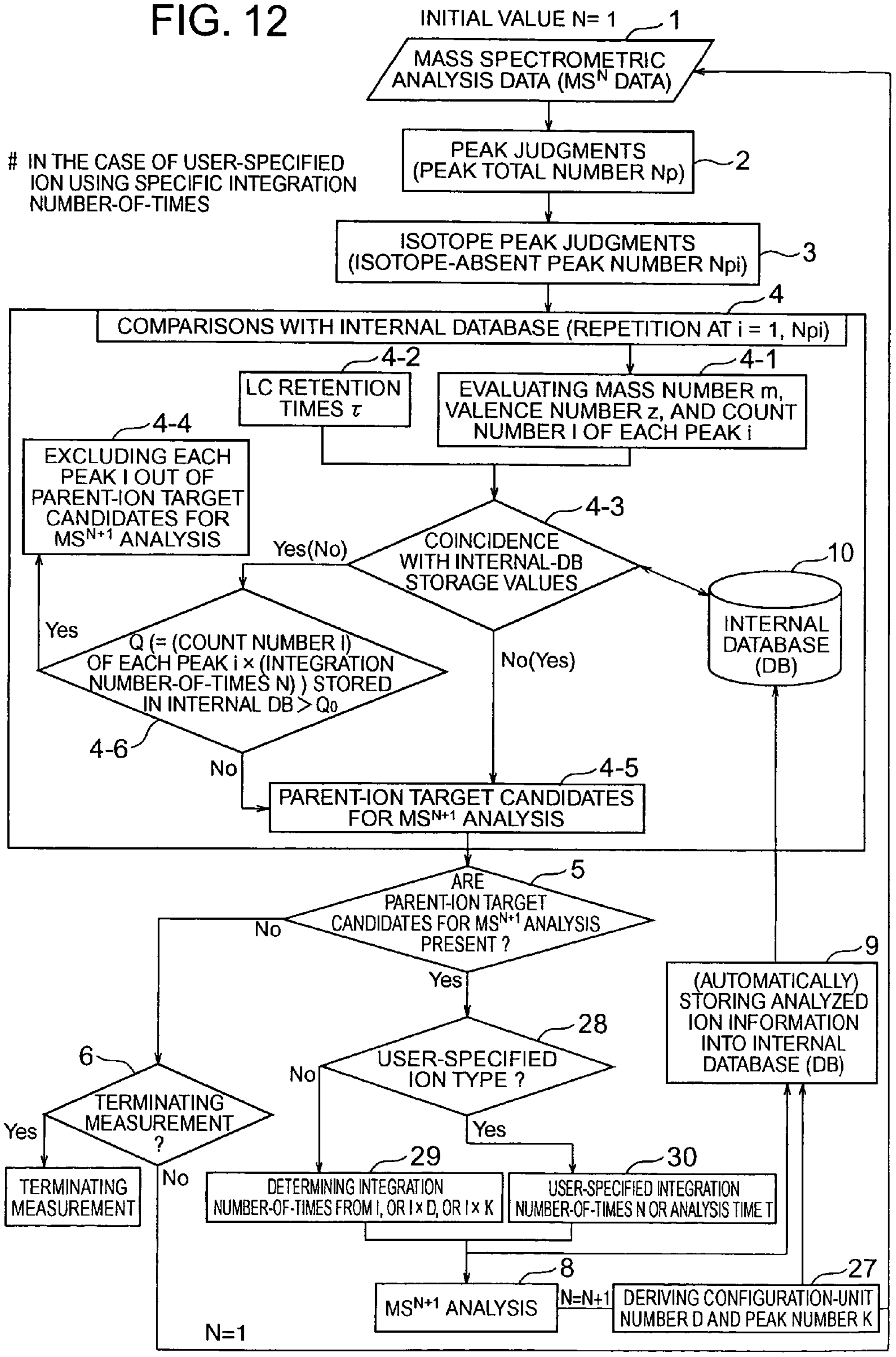
FIG. 12 is a flowchart diagram of the automatic judgment processing in the mass spectrometric analysis flow according to a fourth embodiment of the present invention.

Next, the explanation will be given below concerning a fourth embodiment of the present invention. FIG. 12 illustrates a processing flowchart diagram in the present embodiment. Of ions detected in $MS^n$ analysis whose measurement has been terminated just now, it is judged whether or not there exists information on an ion specified in advance by user in the user input unit 18 (i.e., the mass number m, valence number z, LC retention times τ, and ion intensity I) (step 28). If the parent-ion target candidates are not the user-specified ion type (i.e., No), the integration number-of-times is determined from the ion intensity I (or I×D, or I×K) (step 29). Meanwhile, if there exists an ion which coincides with the user-specified ion type within a constant tolerance degree (i.e., Yes), the ion is selected as the target for $MS^{n+1}$ analysis. Then, the integration number-of-times N or analysis time T in $MS^{n+1}$ analysis is set at a user-specified constant value (step 30).

Figure 13:
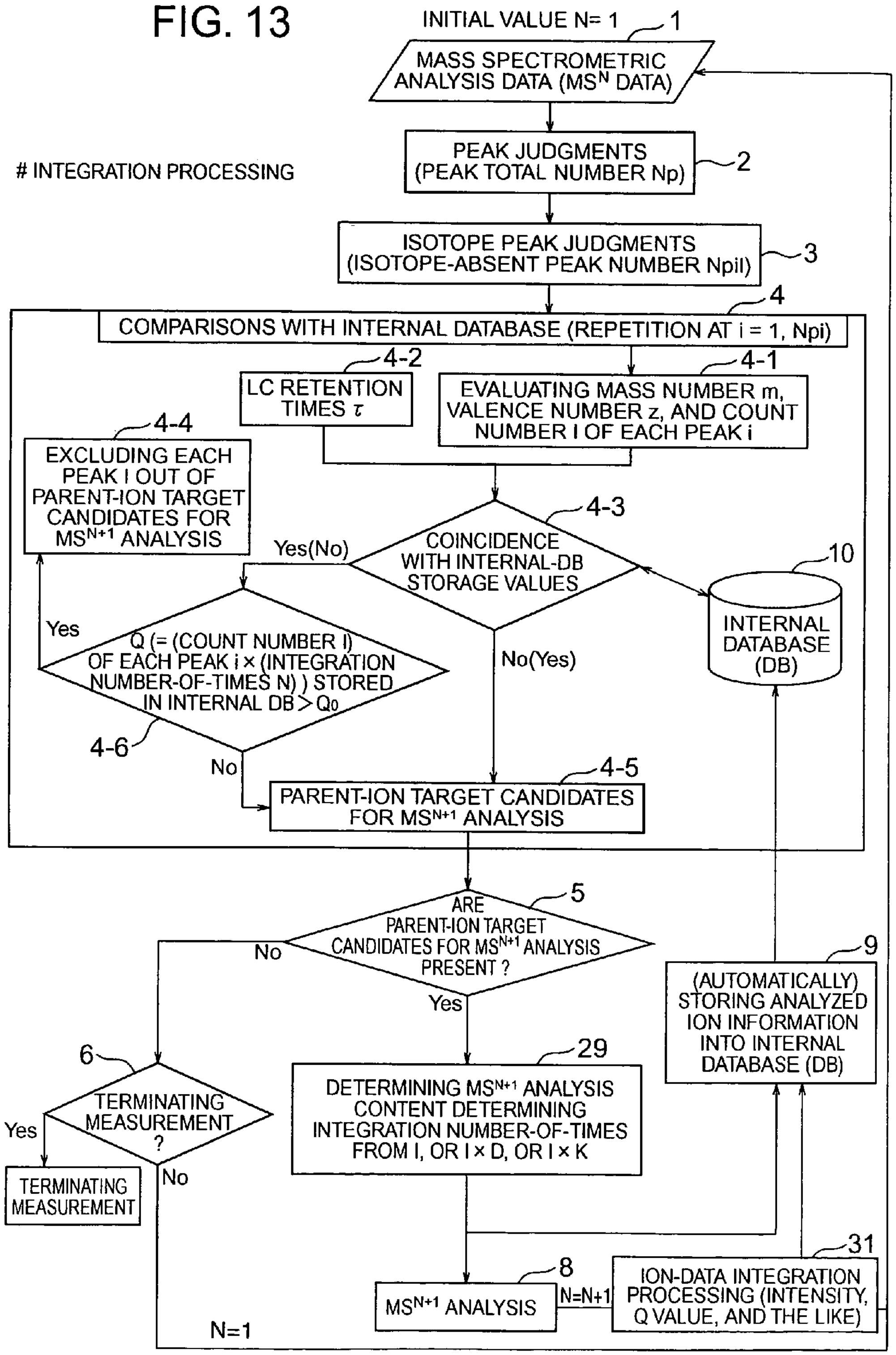
FIG. 13 is a flowchart diagram of the automatic judgment processing in the mass spectrometric analysis flow according to a modified embodiment of the fourth embodiment.

FIG. 13 illustrates a modified embodiment of the fourth embodiment. This is an example of the case where, with respect to an ion type determined by user specification or the like, the data stored in the internal database 10 has coincided therewith with a certain tolerance degree. Here, $MS^{n+1}$ analysis is performed for the selected target ion. Then, its result, during or after the measurement, is integration-processed to the result of $MS^{n+1}$ analysis where the same target ion is selected as its parent ion (step 31). As the ion data to be integration-processed, there exists the intensity I or Q value of the parent ion stored in the internal database 10.

Figure 14:
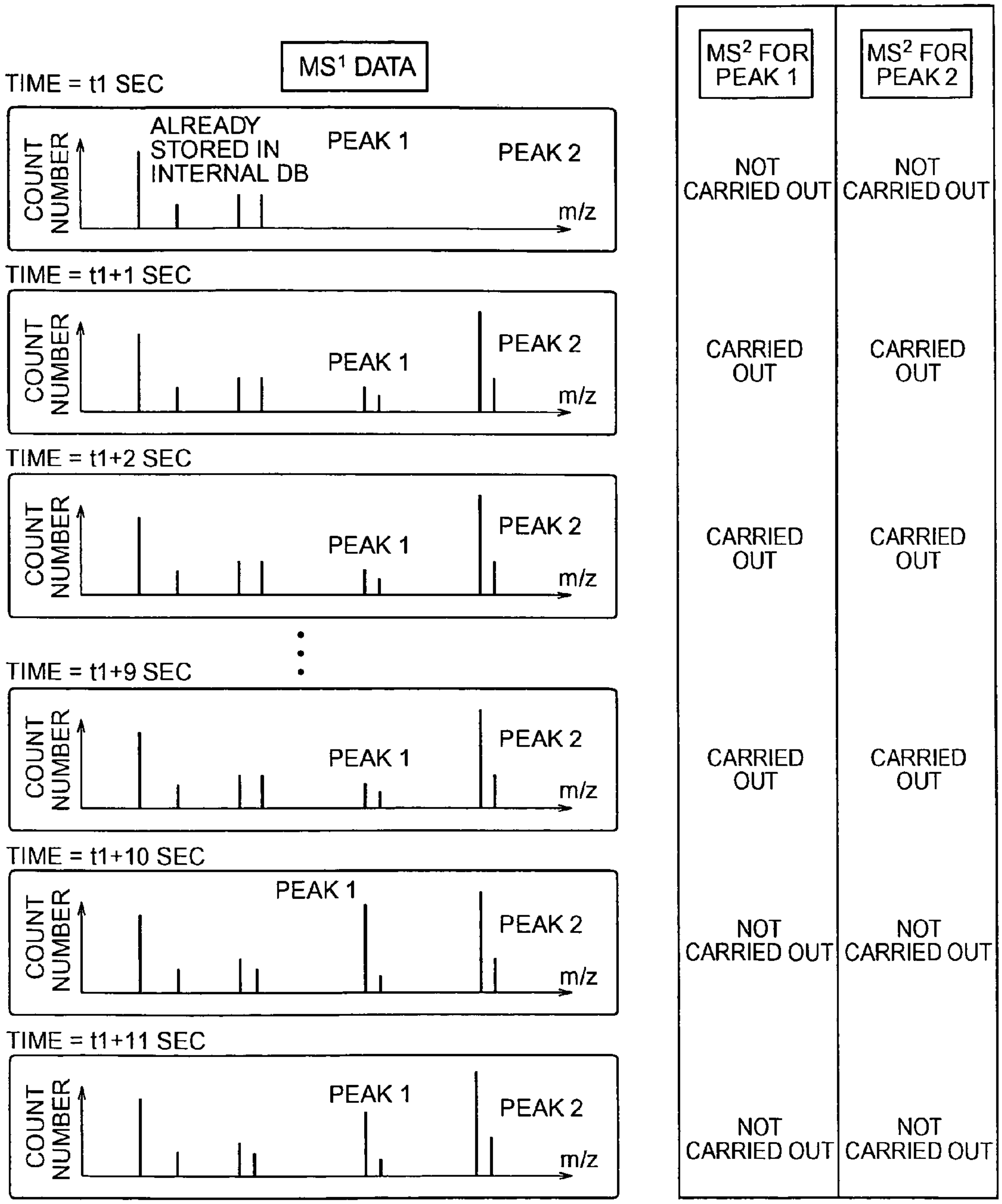
FIG. 14 is an explanatory diagram of a conventional example of the execution of $MS^2$ analysis with respect to the measurement time.

FIG. 14 illustrates an example of judging the carry-out of $MS^2$ analysis from only an emergence time-interval of ions in $MS^1$ analysis. Here, the processing is performed such that $MS^2$ analysis will be carried out during only a predetermined time-interval (e.g., 8 sec) from t=t1+1 (sec) at which the peaks 1 and 2 started to emerge. In this case, FIG. 14 indicates that the carry-out of $MS^2$ analysis has been determined regardless of the intensities of the peaks 1 and 2.

Figure 15:
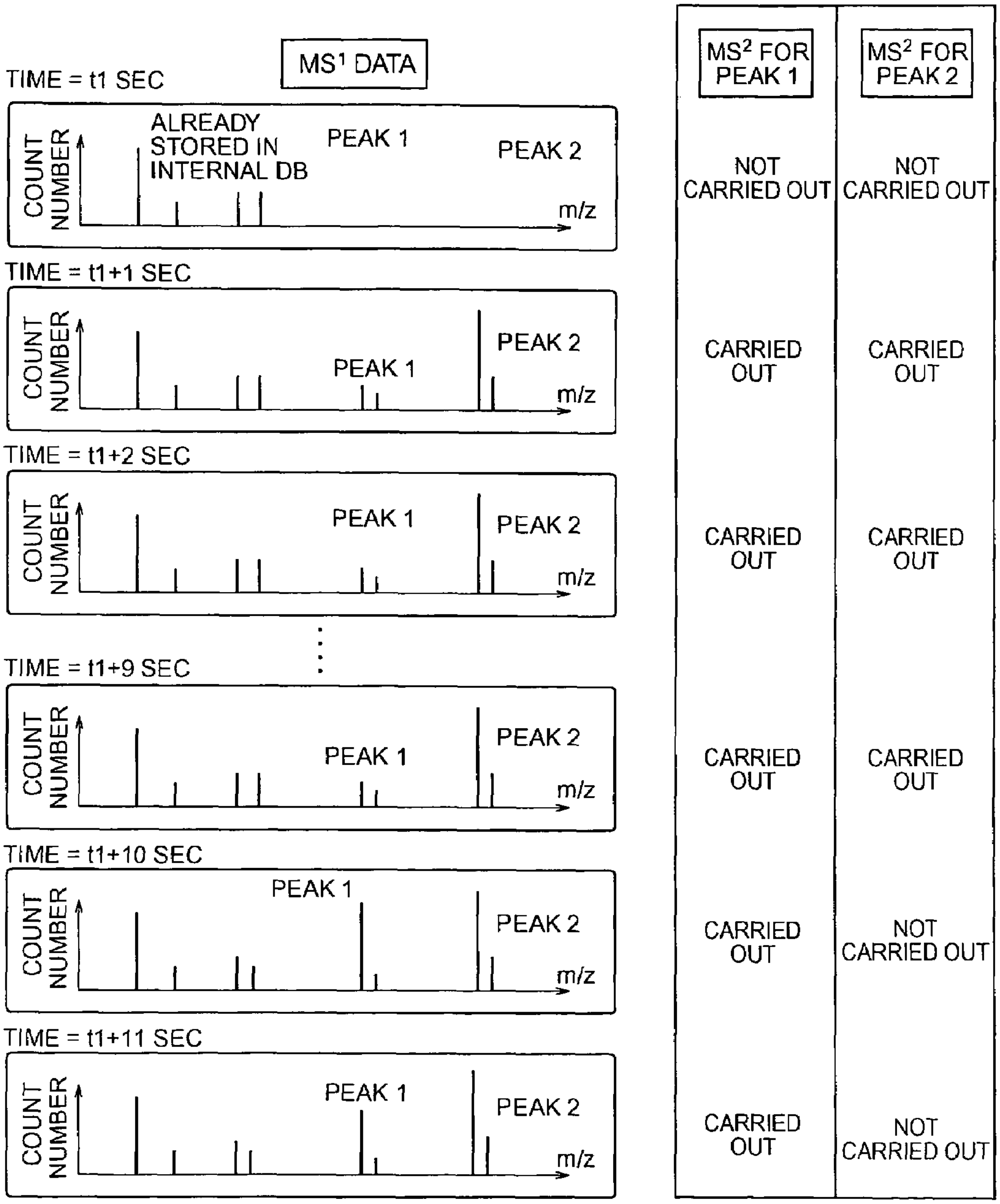
FIG. 15 is an explanatory diagram of the execution of $MS^2$ analysis with respect to the measurement time according to the fourth embodiment.

In the case of the present embodiment, as illustrated in FIG. 15, in the higher-intensity peak 2, at the time of t=t1+9 (sec), the value of (parent-ion intensity (count number $I^n$) in $MS^{n+1}$)×(integration number-of-times N in $MS^{n+1}$)×(configuration-unit read number D of the parent-ion structure) has attained to a predetermined value determined in advance. As a result, $MS^2$ analysis thereinafter will not be carried out. Meanwhile, in the lower-intensity peak 1, the value of (parent-ion intensity (count number $I^n$) in $MS^{n+1}$)×(integration number-of-times N in $MS^{n+1}$)×(configuration-unit read number D of the parent-ion structure) has not attained to the predetermined value. As a result, $MS^2$ analysis will be repeated continuously.

Consequently, according to the present embodiment, the parent-ion intensity is taken into consideration, and thus $MS^{n+1}$ analysis of the user-specified ion type is repeated only at the specified integration number-of-times. Accordingly, the results of $MS^{n+1}$ analysis include substantially the same and minimum-essential information amount. This feature allows implementation of high-efficiency carry-out of the analysis which is capable of performing the high-accuracy structure estimation.

Figure 16:
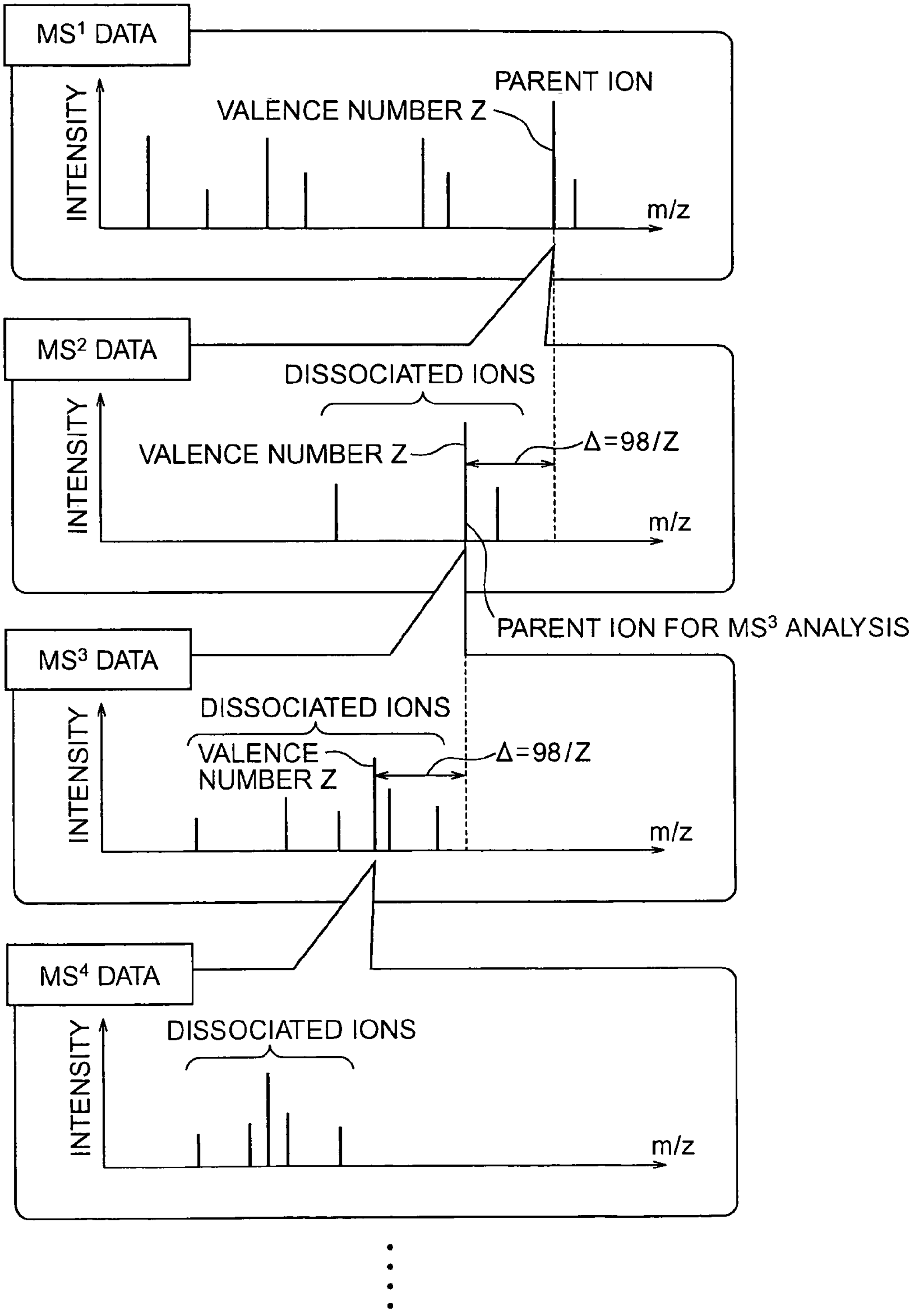
FIG. 16 is an explanatory diagram for explaining the flow of $MS^2$ analysis according to a fifth embodiment of the present invention.

Next, the explanation will be given below concerning a fifth embodiment of the present invention. FIG. 16 illustrates a processing flow of $MS^2$ analysis according to the fifth embodiment. When $MS^{n+1}$ analysis is carried out with respect to a parent ion on $MS^n$, if the following ion type has been detected, $MS^{n+2}$ analysis will be carried out with this ion type employed as the parent ion: Namely, the ion type has the same valence number z as that of the parent ion, and has a mass number which is smaller than the mass number m of the parent ion by the amount of a mass-number difference δ determined by user specification or the like.

FIG. 16 illustrates an example where the user has set the δ value at 98. An ion (: valence number z) detected in $MS^1$ data is selected as a parent ion, then carrying out $MS^2$ analysis for the parent ion. At this time, if an ion has been detected whose mass-number difference from the parent ion is equal to 98, and whose valence number is equal to the valence number z of the parent ion, $MS^3$ analysis will be automatically carried out for this ion. Then, in $MS^3$ data, if an ion has been detected whose mass-number difference from a parent ion (of $MS^3$ analysis) is equal to 98, and whose valence number is equal to the valence number z of the parent ion, $MS^4$ analysis will be automatically carried out for this ion.

For example, if the analysis target is a protein sample, δ=98 [Da] is equivalent to the case where a phosphoric-acid group is at a neutral loss (i.e., is eliminated in the neutral state) in $MS^2$. In the protein analysis, it is considered that phosphoric-acid group modifier of a protein is closely related with information transmission within a living body. Accordingly, at present, the modifier portion is one of the most noteworthy research fields in the protein research.

Consequently, according to the present embodiment, if the user has specified in advance a neutral loss on which the user particularly wishes to focus attention, the analysis will be automatically carried out until $MS^{n+2}$ when the neutral loss is detected. This feature allows acquisition of the more detailed structure information.

Figure 17A:
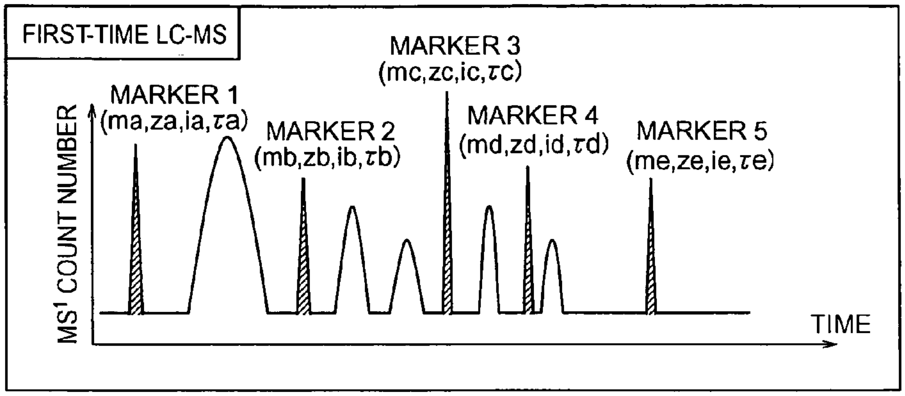
FIGS. 17A and 17B are explanatory diagrams of correction content for the LC retention time according to a sixth embodiment of the present invention.
Figure 17B:
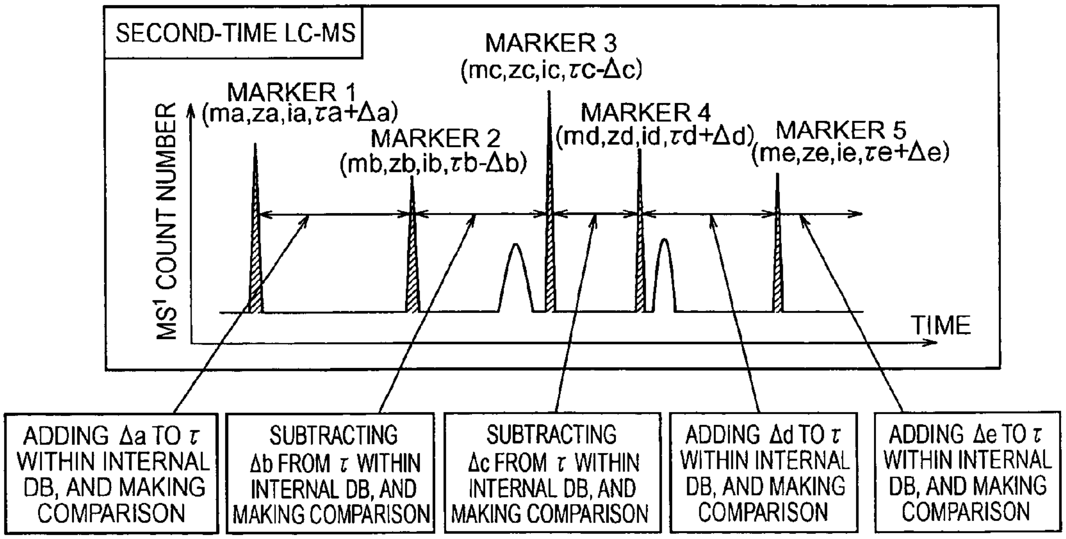

Next, the explanation will be given below concerning a sixth embodiment of the present invention. FIGS. 17A and 17B are explanatory diagrams of correction for the LC retention time according to the sixth embodiment.

When a liquid chromatography or gas chromatography is set up at the preceding stage to the mass spectroscope, a sample is caused to pass through the liquid chromatography or gas chromatography. This causes a difference to occur in the retention time at the time of the pass-through.

On account of this, in the case of an analysis where the sample separated in terms of time is subjected to the mass spectrometric analysis at the subsequent stage, the measurement, where the whole sample is caused to pass through the liquid chromatography (LC)/gas chromatography (GC) thereby to be subjected to the mass spectrometric analysis, is repeated at least two times or more with respect to a part or the whole of the same sample. In this case, the relationship between the count number $I^{n-1}$ and the retention time τ of the parent ion in $MS^n$ is evaluated from the result acquired by the last-time LC (or GC) mass spectrometric analysis. This allows determination of how to select a parent ion in the next-time LC (or GC) mass spectrometric analysis, and determination of the integration number-of-times N or analysis time T in $MS^n$ analysis.

For example, in a certain retention time τ, if there exist only several candidate ions which are to be employed as the analysis targets, the integration number-of-times N in the time-zone is set at a larger value. Meanwhile, if there exist a large number of candidate ions which are to be employed as the analysis targets, the integration number-of-times N is set at a minimum-essential value. This makes it possible to analyze the large number of ions with a high efficiency. The integration number-of-times N to be set is settable by user in advance.

In the correction for the LC (or GC) retention time τ, time area of the chromatogram acquired by the first-time analysis is divided. Then, makers for the retention-time correction are set in the respective areas divided. It is assumed that ions to be set as the makers are higher-intensity specific ions whose peak widths in the chromatogram fall within a user-specified value (e.g., 1 minute).

In FIGS. 17A and 17B, ions a, b, c, d, and e are selected as the makers. In the second-time analysis or thereinafter, the retention-time values stored in the internal database 10 are corrected based on the makers set from the first-time analysis result, and shifts (i.e., differences) in retention times of peaks which will be actually detected in the second-time analysis or thereinafter.

The LC retention time τ has a possibility of varying a little bit on each measurement basis. Accordingly, at least one type or more criterion substance is prepared which has been already stored in the internal database 10. Then, the comparison is made between the retention time of the criterion substance and an actually-measured retention time of the criterion substance, then deriving the difference therebetween Δτ. With respect to the retention times of the other ion types, the correction/proofreading may also be automatically performed by taking advantage of Δτ. At this time, even if the LC retention time τ varies on each measurement basis, by taking advantage of the retention times stored in the internal database, it becomes possible to stably select a target ion type for the next tandem analysis $MS^n$ ($n \geqq 2$).

Consequently, according to the present embodiment, the relationship between the count number $I^{n-1}$ and the retention time τ of the parent ion in $MS^n$ is evaluated from the mass spectrometric analysis result after the last-time LC (or GC). This allows the determination of the selection of a parent ion in the mass spectrometric analysis after the next-time LC (or GC), and the determination of the integration number-of-times N or analysis time T in $MS^n$ analysis.

Also, after the mass spectrometric analysis after the last-time LC (or GC), in each of the retention-time areas divided in the plural number, a certain ion type to be used as the maker is set in each area. In the mass spectrometric analysis after the next-time LC (or GC), if the mass, charge, and retention time $\tau_2$ of this ion type set as the maker coincide with those of a measured ion with a constant tolerance degree (e.g., $\tau_2+\Delta$), the retention time of an ion which will be analyzed thereinafter is corrected by adding Δ to the retention time until the marker in the next retention-time area has been detected.

Figure 18:
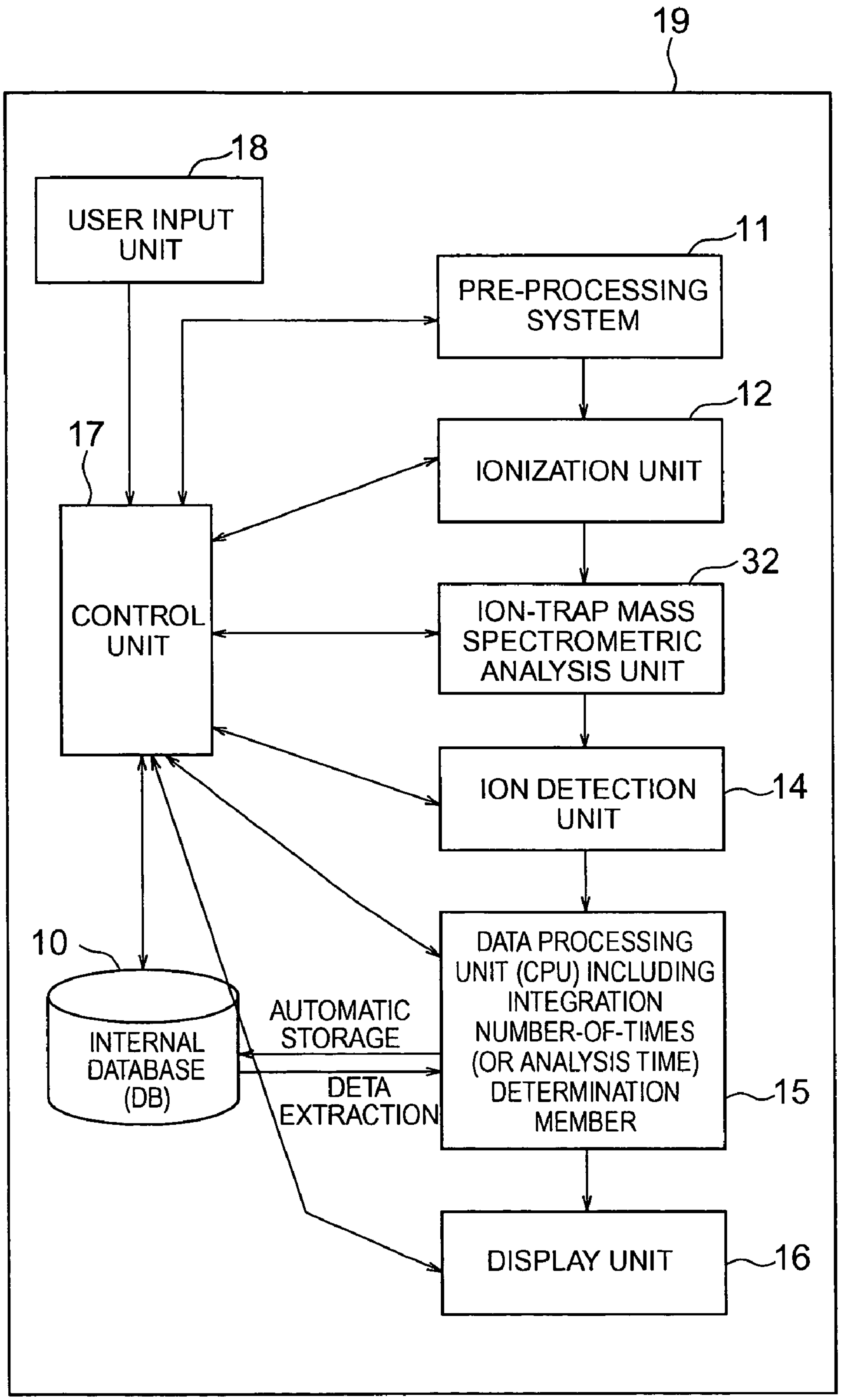
FIG. 18 is an entire configuration diagram of the mass spectrometric analysis system according to a seventh embodiment of the present invention.

Next, the explanation will be given below concerning a seventh embodiment of the present invention. FIG. 18 illustrates a configuration diagram of the seventh embodiment. Here, an ion-trap mass spectrometric analysis unit 32 is set up as the mass spectrometric analysis unit. The other configuration is the same as the one in FIG. 1.

Figure 19:
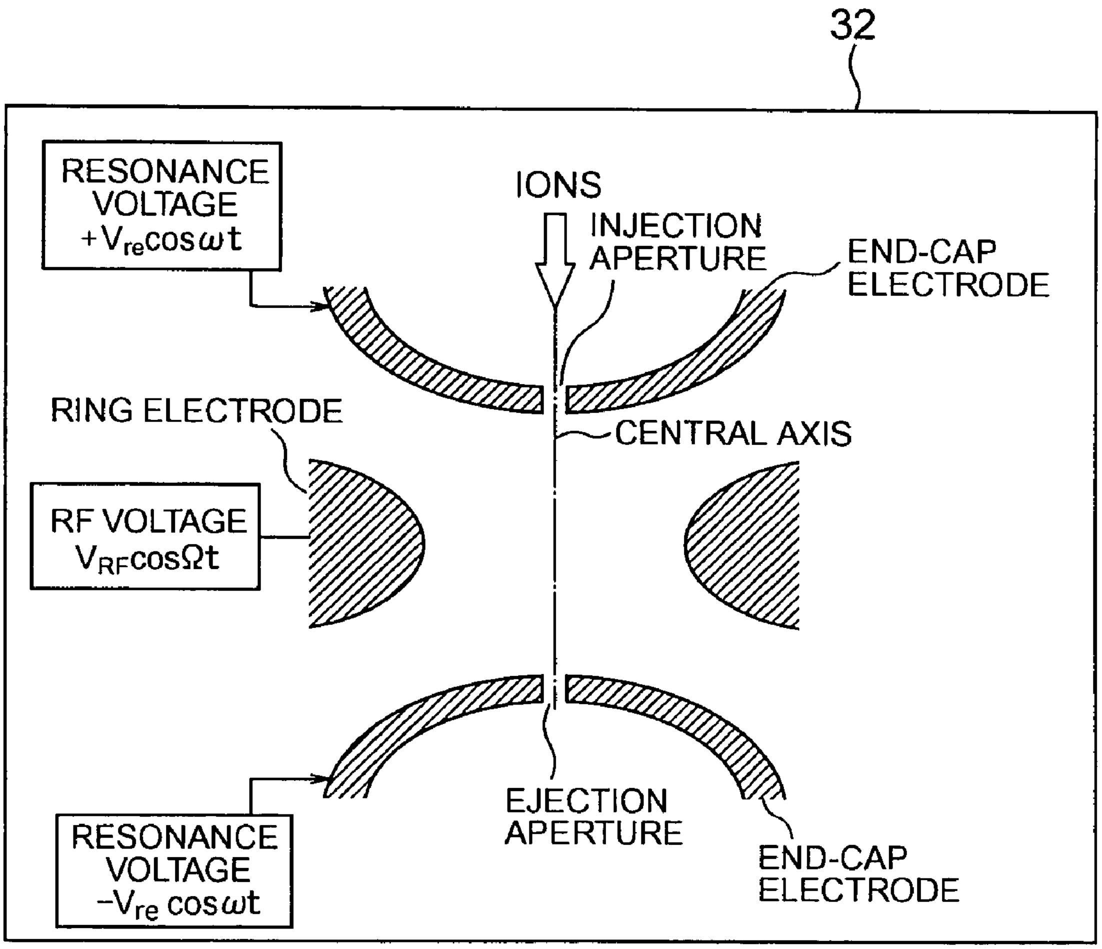
FIG. 19 is a configuration diagram of an ion-trap mass spectrometric analysis unit of the seventh embodiment.

FIG. 19 illustrates the configuration of the ion-trap mass spectrometric analysis unit 32. The ion trap includes a ring electrode and two end-cap electrodes set up in such a manner that the two end-cap electrodes sandwich the ring electrode therebetween in a face-to-face manner. A radio-frequency (RF) voltage $V_{RF}\cos\Omega t$ is applied between the ring electrode and the two end-cap electrodes. Accordingly, a quadrupole electric field is mainly generated within the ion trap. As a result, the ions are vibrated with different vibration frequencies depending on their m/z values, then being trapped (i.e., accumulated).

Here, when the collision induced dissociation (CID) method is employed as the dissociation method at the time of performing the tandem mass spectrometric analysis, the ion trap itself, which is filled with a neutral gas such as He gas, plays a role of the collision cell. Consequently, there exists no necessity for providing the collision cell separately.

After a target for the tandem mass spectrometric analysis $MS^n$ ($n\geqq 2$) has been automatically judged according to the present invention, with a specific ion type having its m/z left behind, all the other ion types are ejected by resonance ejection. Then, the remaining specific ion type left behind within the ion trap is vibrated by resonance vibration in a degree of not being ejected out of the ion trap. This resonance vibration causes the specific ion type to be forcedly collided with the neutral gas, thereby dissociating the target ion type for the tandem mass spectrometric analysis $MS^n$ ($n\geqq 2$).

At this time, resonance voltages are applied between the end-cap electrodes. These resonance voltages are voltages $\pm V_{re}\cos\omega t$, whose frequency $\omega$ is substantially the same as the resonance vibration frequency $\omega_0$ of the specific ion type within the ion trap (i.e., $\omega\approx\omega_0$), and whose phase is inverted relative to the phase of the resonance vibration of the specific ion type. The voltages $+V_{re}\cos\omega t$ and $-V_{re}\cos\omega t$ are applied to the respective end-cap electrodes, respectively.

Depending on the mass-to-charge ratio m/z value of the next target ion type automatically judged by the system of the present invention, at the time of the above-described tandem mass spectrometric analysis, the values such as amplitude of the radio-frequency voltage and frequency and amplitude of the resonance voltages are automatically subjected to the adjustment/optimization control.

As described above, the ion trap is capable of carrying out the tandem mass spectrometric analysis $MS^n$ ($n\geqq 2$). Consequently, the system of automatically judging the next target like the present invention is exceedingly effective therein.

Figure 20:
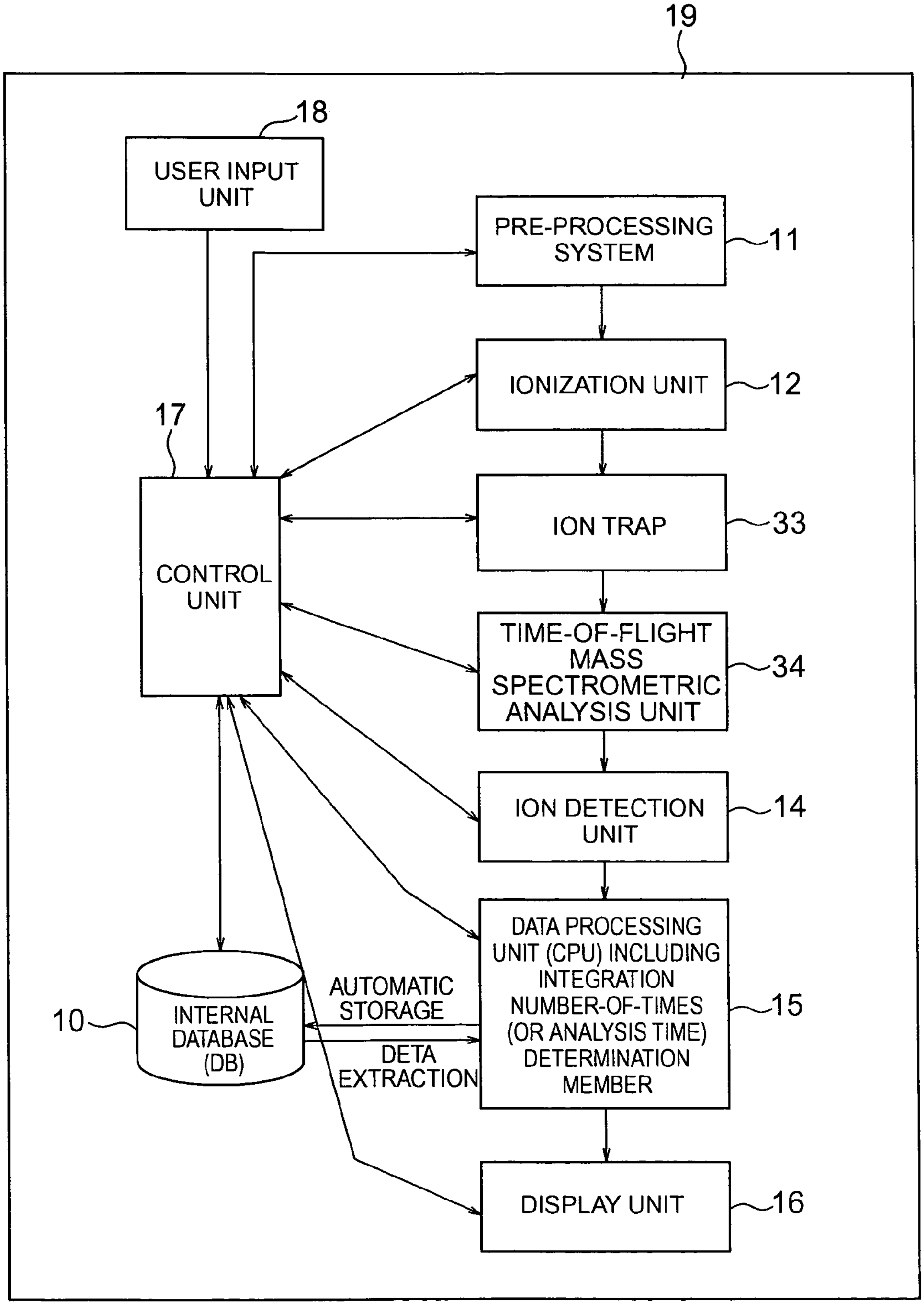
FIG. 20 is an entire configuration diagram of the mass spectrometric analysis system according to an eighth embodiment of the present invention.

Next, the explanation will be given below concerning an eighth embodiment of the present invention. FIG. 20 illustrates a configuration diagram of the mass spectrometric analysis system according to the present embodiment. Here, an ion-trap/time-of-flight (TOF) mass spectrometric analysis unit is set up as the mass spectrometric analysis unit.

Similarly to the seventh embodiment, an ion trap 33 plays the roles of accumulation of the ions, selection of a parent ion, and the collision cell. Similarly, depending on the mass-to-charge ratio m/z value of the next target ion type automatically judged by the present system, at the time of the above-described tandem mass spectrometric analysis, the values such as amplitude of the radio-frequency voltage and frequency and amplitude of the resonance voltages, i.e., the applied voltages in the ion trap, are automatically subjected to the adjustment/optimization control.

In the actual mass spectrometric analysis, the high-resolution analysis is performed in a TOF unit 34. If the tandem analysis has been judged to be necessary by the comparison with the internal database 10, a parent ion is selected/dissociated in the ion trap 33, then being subjected to the mass spectrometric analysis in the TOF unit 34. Meanwhile, if the tandem analysis has been judged to be unnecessary, the parent ion passes through the ion trap 33, then being subjected to the mass spectrometric analysis in the TOF unit 34.

According to the present embodiment, the necessity for the tandem analysis can be judged automatically. This feature makes it possible to carry out the analysis with an exceedingly high efficiency.

Figure 21:
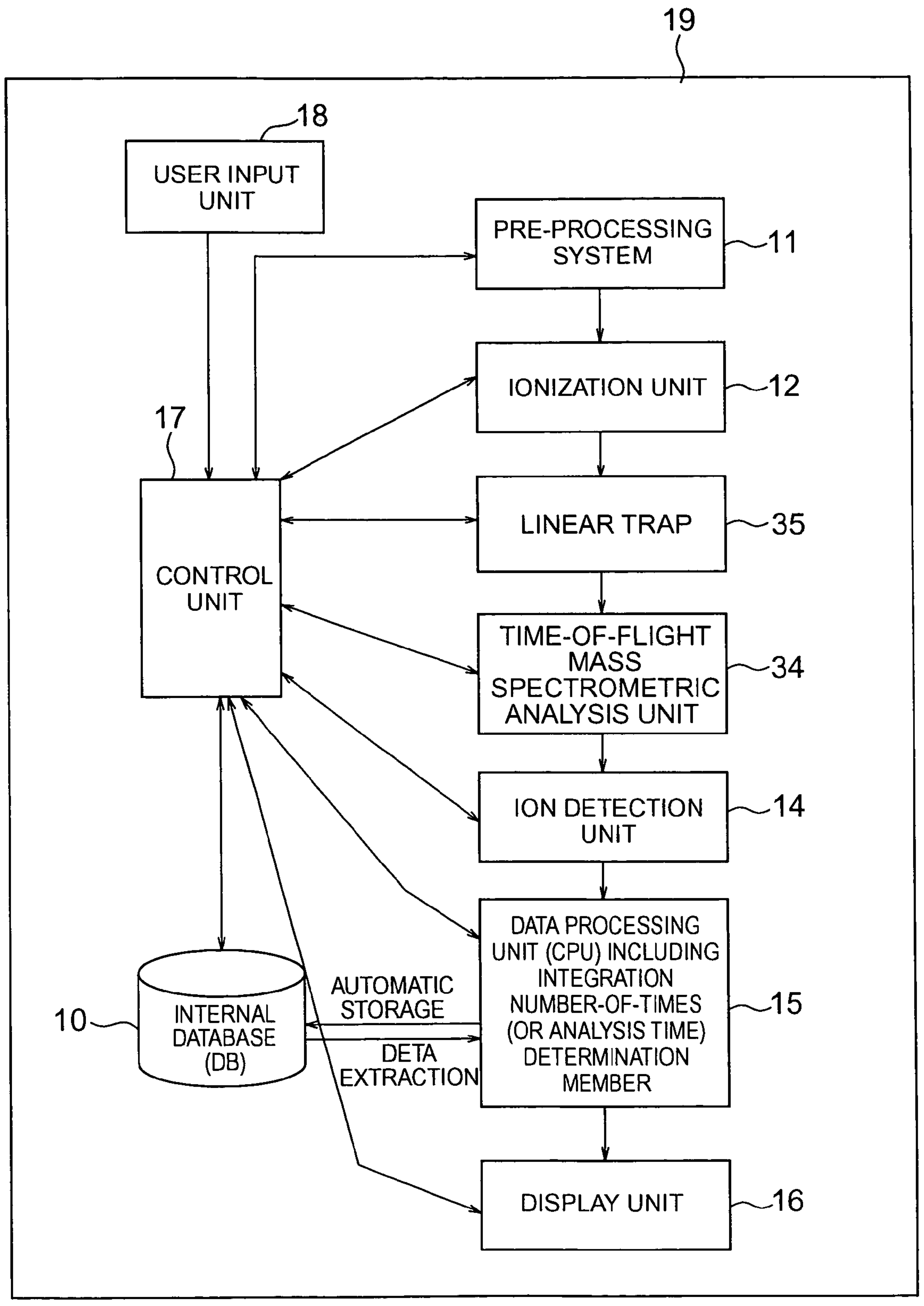
FIG. 21 is an entire configuration diagram of the mass spectrometric analysis system according to a ninth embodiment of the present invention.

Next, the explanation will be given below concerning a ninth embodiment of the present invention. FIG. 21 illustrates a configuration diagram of the mass spectrometric analysis system according to the present embodiment. Here, a linear-trap/time-of-flight (TOF) mass spectrometric analysis unit is set up as the mass spectrometric analysis unit.

Figure 22:
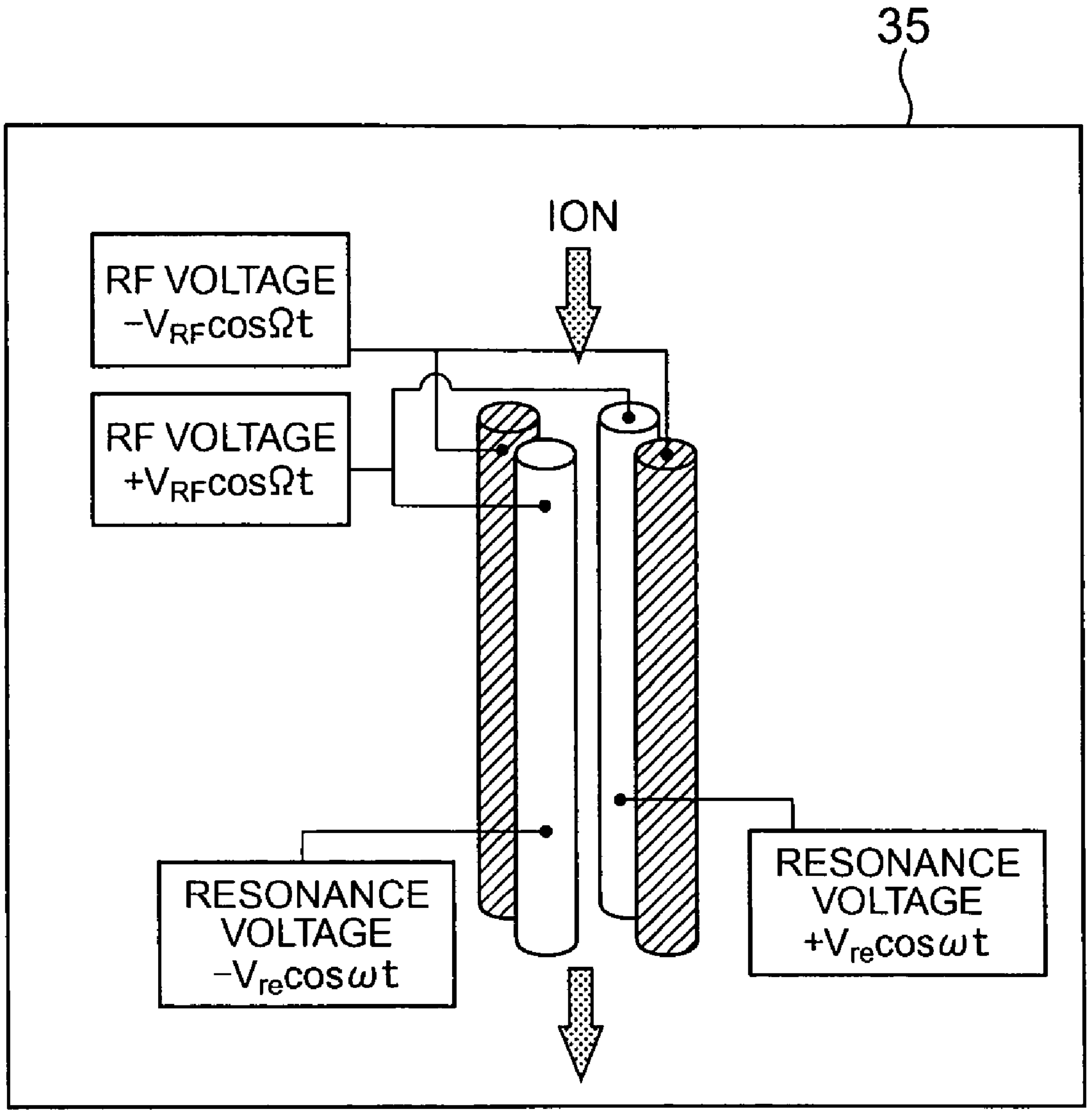
FIG. 22 is a configuration diagram of an ion-trap mass spectrometric analysis unit of the ninth embodiment.

FIG. 22 illustrates a configuration diagram of the linear-trap mass spectrometric analysis unit. A linear trap 35 includes four pole-shaped electrodes (quadrupole electrodes). Spacings among the quadrupole electrodes, which are filled with a neutral gas, play the roles of accumulation of the ions, selection of a parent ion, and the collision cell. Defining the electrodes positioned in a face-to-face manner as one set of equal-potential electrodes, radio-frequency voltages $\pm V_{RF}\cos\Omega t$ whose phases are inverted to each other are applied between the respective two sets of equal-potential electrodes, respectively.

Accordingly, a radio-frequency quadrupole electric field is mainly generated within the linear trap 35. As a result, the ions are vibrated with different vibration frequencies depending on their m/z values, then being trapped (i.e., accumulated). After a target for the tandem mass spectrometric analysis $MS^n$ ($n\geqq 2$) has been judged according to the present invention, with a specific ion type having its m/z left behind, all the other ion types are ejected by resonance ejection. Then, the remaining specific ion type left behind within the linear trap is vibrated by resonance vibration in a degree of not being ejected out of the linear trap. This resonance vibration causes the specific ion type to be forcedly collided with the neutral gas, thereby dissociating the target ion type for the tandem mass spectrometric analysis $MS^n$ ($n\geqq 2$).

At this time, resonance voltages are applied between the one set of electrodes positioned in a face-to-face manner. These resonance voltages are voltages $\pm V_{re}\cos\omega t$, whose frequency $\omega$ is substantially the same as the resonance vibration frequency $\omega_0$ of the specific ion type within the linear trap 35 (i.e., $\omega\approx\omega_0$), and whose phase is inverted relative to the phase of the resonance vibration of the specific ion type. The voltages $+V_{re}\cos\omega t$ and $-V_{re}\cos\omega t$ are applied to the respective one set of electrodes positioned in a face-to-face manner, respectively.

Depending on the mass-to-charge ratio m/z value of the next target ion type automatically judged by the system of the present invention, at the time of the above-described tandem mass spectrometric analysis, the values such as amplitude of the radio-frequency voltage and frequency and amplitude of the resonance voltages are automatically subjected to the adjustment/optimization control.

In the ninth embodiment, as compared with the eighth embodiment, trap ratio of the ions is enhanced tremendously (i.e., about eight times). Consequently, the next analysis content is-determined based on the high-sensitivity data. This feature makes it possible to carry out the judgment with an exceedingly high accuracy.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A mass spectrometric analysis system using a tandem mass spectroscope for ionizing a measurement-target substance, performing mass spectrometric analysis of various ion types generated, selecting and dissociating an ion type from among said various ion types generated, said ion type having a specific mass-to-charge ratio (m/z), and thereby, repeating mass spectrometric analysis measurement on said ion of said ion type over n stages (n=1, 2, . . . ), wherein said mass spectrometric analysis system comprises:

a data processing unit for judging control content for the analysis next to $MS^n$ within a predetermined time, on each analysis-target ion basis, and based on ion intensity, said $MS^n$ being said n-th stage mass spectrometric analysis, said ion intensity being represented by an ion peak with respect to said mass-to-charge ratio of each ion in said $MS^n$ result.

2. The mass spectrometric analysis system according to claim 1, wherein said predetermined time is a time during which said next analysis measurement is not aborted from said n-th stage mass-spectrum measurement, or a preparation time during which said n-th stage mass-spectrum measurement is transferred to said next analysis measurement, or whatever time of 100 m sec, 10 m sec, 5 m sec, and 1 m sec.

3. The mass spectrometric analysis system according to claim 1, wherein said control content for said analysis next to said $MS^n$ is integration number-of-times N or analysis time T in $MS^{n+1}$ ($n \geqq 1$) analysis.

4. The mass spectrometric analysis system according to claim 1, wherein said analysis next to said $MS^n$ is $MS^{n+1}$ analysis where one of ion types detected in said $MS^n$ ($n \geqq 1$) is selected as a parent ion, and where said patent ion is dissociated and subjected to mass spectrometric analysis, or $MS^{n+1}$ analysis where, if an ion type, whose mass number is equal to said parent ion selected and dissociated in said $MS^n$ ($n \geqq 1$), but whose valence number differs therefrom, is detected from said $MS^n$ data, said ion type is selected as a parent ion, and said parent ion is dissociated and subjected to mass spectrometric analysis.

5. The mass spectrometric analysis system according to claim 1, wherein, if total of count number of parent ions in said $MS^n$ is larger than a numerical value determined in advance, said parent ions are avoided so that said parent ions will not become target-ion type for selection and dissociation in said analysis next to said $MS^n$, said $MS^n$ being said n-th stage mass spectrometric analysis.

6. The mass spectrometric analysis system according to claim 1, wherein, if a dissociated ion whose charge is equal to charge of a parent ion on said $MS^n$ has been measured in said $MS^{n+1}$, and if said dissociated ion has its mass which is smaller than mass of said parent ion by $\delta$, and if $\delta$ coincides with a user-specified value x with a certain tolerance degree $\epsilon$, $MS^{n+2}$ analysis will be carried out, or said $MS^{n+2}$ analysis will be carried out after integration number-of-times N or analysis time T for said $MS^n$ of said parent ion has been set at a user-specified set value.

7. The mass spectrometric analysis system according to claim 6, wherein said $\delta$ is mass of phosphoric acid, carbohydrate chain (monosaccharide), lipid, and an organic substance.

8. A mass spectrometric analysis method, comprising the steps of:

ionizing a measurement-target substance, performing mass spectrometric analysis of various ion types generated, selecting and dissociating an ion type from among said various ion types generated, said ion type having a specific mass-to-charge ratio (m/z), and thereby, repeating mass spectrometric analysis measurement on said ion of said ion type over n stages (n=1, 2, . . . ), wherein control content for the analysis next to $MS^n$ is judged within a predetermined time, on each analysis-target ion basis, and based on ion intensity, said $MS^n$ being said n-th stage mass spectrometric analysis, said ion intensity being represented by an ion peak with respect to said mass-to-charge ratio of each ion in said $MS^n$ result.

9. The mass spectrometric analysis method according to claim 8, further comprising a step of:

judging said control content for said analysis next to said $MS^n$ based on mass-peak intensity of a parent ion which, of said $MS^n$ mass-spectrum measurement result, is selected as dissociation target in said analysis next to said $MS^n$.

10. The mass spectrometric analysis method according to claim 9, further comprising a step of:

determining integration number-of-times N or analysis time T for said analysis next to said $MS^n$ from large-or-small relationship between intensity of a parent-ion type in said $MS^n$ data and said intensity of said parent-ion type this time, said parent-ion type in said $MS^n$ data being the same as said parent-ion type this time, said intensity of said parent-ion type in said $MS^n$ data being acquired by performing mass spectrometric analysis similarly as before with respect to a measurement-target substance which is the same as said measurement-target substance.

11. The mass spectrometric analysis method according to claim 8, further comprising a step of:

judging said control content for said analysis next to said $MS^n$ based on peak number or structure-unit number when $MS^{n+1}$ measurement has been carried out with respect to a parent ion on said $MS^n$, said parent ion on said $MS^n$ being the same as said parent ion this time, and being acquired by carrying out mass spectrometric analysis before with respect to a measurement-target substance which is the same as said measurement-target substance, said peak number being peak number in said $MS^{n+1}$ already carried out, said structure-unit number being estimated with respect to said parent ion of dissociation target therein.

12. The mass spectrometric analysis method according to claim 8, further comprising a step of:

distributing total integration number-of-times for said analysis next to said $MS^n$ when measurement on intensity of each parent ion or $MS^{n+1}$ measurement has been already carried out, so that distributed integration number-of-times will become inversely proportional to product of peak number K and structure-unit number D of each parent ion ($K \times D$), said peak number K being detected in said $MS^{n+1}$ measurement already carried out, said structure-unit number D being estimated therein.

13. A mass spectrometric analysis system using a tandem mass spectroscope for ionizing a measurement-target substance, performing mass spectrometric analysis of various ion types generated, selecting and dissociating an ion type from among said various ion types generated, said ion type having a specific mass-to-charge ratio (m/z), and thereby, repeating mass spectrometric analysis measurement on said ion of said ion type over n stages (n=1, 2, . . . ), wherein said mass spectrometric analysis system comprises:

a pre-processing system positioned at preceding stage and including a liquid chromatography or gas chromatography, an internal database for storing mass number of each ion type and characteristic data on retention time τ in said pre-processing system with respect to result of $MS^n$ analysis which is said n-th stage mass spectrometric analysis, and a data processing unit for judging control content for the analysis next to $MS^n$ within a predetermined time, on each analysis-target ion basis, and based on ion intensity, said ion intensity being represented by an ion peak with respect to said mass-to-charge ratio of each ion.

14. The mass spectrometric analysis system according to claim 13, wherein said internal database is configured to automatically store characteristic data on an ion type measured once, or characteristic data on various peptides whose decomposition and occurrence are predicted, said decomposition and occurrence being caused by a specified enzyme with respect to a protein identified once.

15. The mass spectrometric analysis system according to claim 13, wherein said internal database stores characteristic data on various peptides whose decomposition and occurrence are predicted, said decomposition and occurrence being caused by a specified enzyme with respect to a protein input and specified in advance by user, characteristic data on a chemical substance input and specified in advance by said user, and characteristic data on a specific ion type originating from noise or impurity.

16. The mass spectrometric analysis system according to claim 13, wherein said mass number, valence number, said LC retention time, and said ion intensity of each ion analyzed in said $MS^n$ analysis are compared with data stored in said internal database, and, if said analyzed data coincide with said information on each ion specified in advance by user, integration number-of-times N or analysis time T for $MS^{n+1}$ analysis is determined at a value specified by said user.

17. The mass spectrometric analysis system according to claim 13, wherein, when said characteristic data on an in-advance specified ion type stored in said internal database and said ion type detected in said $MS^n$ analysis coincide with each other, if product of count number of parent ions of said ion types which coincide with each other, and integration number-of-times for $MS^{n+1}$, and read number of unit structures configuring said parent-ion structure is larger than a numerical value determined by user specification, said same ion type is excluded out of target-ion type for selection and dissociation, said count number being stored in said internal database, and if said product is less than said numerical value determined by said user specification, said same ion type is selected as a candidate for said target-ion type for said selection and dissociation.

* * * * *